(12) United States Patent
Hoshi

(10) Patent No.: US 7,782,498 B2
(45) Date of Patent: Aug. 24, 2010

(54) IMAGE READING APPARATUS AND METHOD WITH REDUCED WAKE-UP TIME AFTER SLEEP MODE

(75) Inventor: Kazunori Hoshi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1152 days.

(21) Appl. No.: 11/357,986

(22) Filed: Feb. 22, 2006

(65) Prior Publication Data

US 2006/0193013 A1    Aug. 31, 2006

(30) Foreign Application Priority Data

Feb. 28, 2005   (JP)   ............... 2005-052888

(51) Int. Cl.
    *H04N 1/04*   (2006.01)
(52) U.S. Cl. .................. 358/474; 358/1.2; 358/486; 358/497; 399/376; 399/377; 399/379; 713/300
(58) Field of Classification Search .................. 358/474, 358/488, 496, 498
    See application file for complete search history.

(56) References Cited

U.S. PATENT DOCUMENTS

| 4,899,192 | A | * | 2/1990 | Fujita ................ 355/51 |
| 5,423,512 | A | | 6/1995 | Ushio et al. |
| 6,359,701 | B1 | | 3/2002 | Yamada et al. |
| 6,418,281 | B1 | | 7/2002 | Ohki |
| 7,460,808 | B2 | | 12/2008 | Okada |
| 2001/0040704 | A1 | * | 11/2001 | Kanno ............... 358/474 |
| 2002/0048470 | A1 | * | 4/2002 | Kanno ............... 399/205 |
| 2002/0054330 | A1 | | 5/2002 | Jinbo et al. |
| 2002/0146256 | A1 | | 10/2002 | Sekiguchi et al. |
| 2002/0178389 | A1 | | 11/2002 | Satoh |
| 2003/0107784 | A1 | * | 6/2003 | Togashi .............. 358/528 |
| 2004/0088066 | A1 | | 5/2004 | Yamazaki et al. |
| 2004/0146313 | A1 | | 7/2004 | Uchizono et al. |
| 2005/0271411 | A1 | | 12/2005 | Shibaki et al. |
| 2006/0077418 | A1 | | 4/2006 | Nakajima et al. |
| 2006/0100724 | A1 | | 5/2006 | Miura et al. |
| 2006/0174141 | A1 | * | 8/2006 | Chang ................ 713/300 |

FOREIGN PATENT DOCUMENTS

| JP | 62061040 | A | * | 3/1987 |
| JP | 6-189075 | | | 7/1994 |
| JP | 06-326867 | | | 11/1994 |
| JP | 10-136203 | | | 5/1998 |

(Continued)

*Primary Examiner*—King Y Poon
*Assistant Examiner*—David S Cammack
(74) *Attorney, Agent, or Firm*—Oblon, Spivak, McClelland, Maier & Neustadt, L.L.P.

(57) ABSTRACT

An image reading apparatus is provided that includes an image sensor configured to convert image light of a document into an image signal, an optical unit configured to project the image light of the document on the image sensor, a drive unit configured to drive the optical unit in a sub scanning direction, a document size detecting unit configured to detect a size of the document using the image signal, an image signal processing unit configured to digitally convert the image signal of the image sensor into image data, a power circuit configured to output an operating voltage in standby mode and stop the outputting of the operating voltage in sleep mode, and a power saving control unit configured to position the optical unit to a document size detecting position before switching the power circuit from the standby mode to the sleep mode.

20 Claims, 20 Drawing Sheets

FOREIGN PATENT DOCUMENTS

| | | | |
|---|---|---|---|
| JP | 11075025 A * | 3/1999 | |
| JP | 2001018486 A * | 1/2001 | |
| JP | 2001-211417 | 8/2001 | |
| JP | 2001-282041 | 10/2001 | |
| JP | 2001-285583 | 10/2001 | |
| JP | 2004-109639 | 4/2004 | |
| JP | 2004-126132 | 4/2004 | |
| JP | 2004-147078 | 5/2004 | |
| JP | 2004-229110 | 8/2004 | |
| JP | 2004-258386 | 9/2004 | |
| JP | 2004-282517 | 10/2004 | |
| JP | 2004-320333 | 11/2004 | |
| JP | 2004357023 A * | 12/2004 | |
| JP | 2005-31333 | 2/2005 | |
| JP | 2005-35739 | 2/2005 | |
| JP | 2005-051443 | 2/2005 | |

* cited by examiner

IMAGE READING APPARATUS AND METHOD WITH REDUCED WAKE-UP TIME AFTER SLEEP MODE

BACKGROUND OF THE INVENTION

1. Field of the Invention

The present invention generally relates to an image reading apparatus configured to read a document image by driving an optical system that projects image light of the document on an image sensor in a sub scanning direction. The present invention particularly relates to an image reading apparatus that includes a power saving power circuit and an imaging apparatus using such an image reading apparatus. For example, an image reading apparatus according to an embodiment of the present invention may be used in a document scanner, a digital copier, or a facsimile machine.

2. Description of the Related Art

In Japanese Laid-Open Patent Publication No. 2004-258386, a flat-bed document scanner is disclosed that is configured to irradiate light on an original document 101 placed on a translucent document table 102 by a panel lamp 103 that is included in a first carriage 105, reflect the reflected light of the document (image light) by a first mirror 104 in a direction parallel to the sub scanning direction, reverse the direction of the reflected image light in the sub scanning direction by second and third mirrors 106 and 107 included in a second carriage 108 that is driven in the same direction at a speed ½ the speed of the first carriage 105, and project the image light on a CCD 109 by a lens 106. According to this disclosure, the CCD 110 converts image light into image signals. When the open angle of an original document cover 112 is less than 40 degrees, the powers of a lamp and the CCD 110 are tuned on, and when the open angle of the original document cover is 15 degrees or lower, the original document size is determined based on the image signals of the CCD (FIG. 17). In other words, the original document size is determined using the image signals of the CCD 107 that is configured to read the original document image when the original document cover is closed.

Japanese Laid-Open Patent Publication No. 6-189075 discloses an image reading apparatus that is configured to move an original document size reading black plate 104 and a shading correction white reference plate 103 back and forth from a position facing a sheet-through window 112 arranged at the other side of an original document passage. According to this disclosure, a connected structure of the black plate 104 and the white reference plate 103 is driven in a sheet transferring direction by a drive solenoid and a return spring, and the white reference plate 103 is read at the position facing the window 112 after which the black plate 104 is moved to the position facing the window 112 and read in order to detect the original document size.

Japanese Laid-Open Patent Publication No. 2004-109639 discloses an image reading apparatus that is configured to drive a flat-bed first carriage 12 to a position of the a white reference plate 5 upon switching from a standby mode to a power saving mode, and read the white reference plate 5 and drive the first carriage to an original document size reading position Ph upon returning from the power saving mode to the standby mode.

Japanese Laid-Open Patent Publication No. 2004-320333 discloses a copier apparatus in which an image reading unit is configured to acquire a power saving duration time from a printer engine controller upon returning from a power saving mode to standby mode; perform an initialization process involving setting a parameter determining the digital conversion parameters for an image signal processing circuit that digitally converts an image signal of a solid image capturing device such as a CCD into appropriate image data and store the set parameter in a nonvolatile memory when the acquired duration time is longer than a predetermined time; and read the parameter set in a previous initialization process from the nonvolatile memory and set the read parameter to the image signal processing circuit when the elapsed time from the time of the previous initialization process is shorter than the predetermined time.

In the disclosures cited above, for example, a document size detection technique is used that involves determining a main scanning direction width of a document placed on a document scanner without using a document size detecting sensor and determining such a document width based on an image signal of a CCD that converts a document image into image signals. By using such a technique, the number of sensors that have to be included in the document scanner may be reduced to thereby realize cost reduction. However, there are drawbacks to using such a document size detection technique as is described below. When the above-described technique is used, the document size detection is performed after the document scanner is switched to a document reading enabled state. Specifically, homing and/or AGC (automatic gain control) are performed from the time the power is supplied to the document scanner to the time the document size is detected. Homing refers to a process of initializing sub scanning position information to sub scanning position information detected by a reference point sensor when a carriage that scans a document in the sub scanning direction is driven in the sub scanning direction to be detected by the reference point sensor. AGC refers to a process of driving a carriage to a reference white plate reading position, reading the reference white plate, and updating the image signal amplitude gain and other parameters of an image signal processing circuit that digitally converts an image signal of an image sensor such as a CCD into image data so that the read data takes an appropriate value.

It is noted that in a case where a power circuit having a power saving mode is used, greater power saving effects may be realized when the switching waiting time for switching to the power saving mode is reduced. The switching waiting time for switching to the power saving mode refers to a predetermined value representing a time period during which a standby mode (i.e., mode in which operations may be immediately started in response to a user command) is to be maintained without receiving any operations command from a user, for example. When the time period during which no user command is received exceeds this predetermined time period, the power circuit is switched from the standby mode to the power saving mode.

The power circuit is switched back to the standby mode from the power saving mode in response to the user operating on the image reading apparatus. However, in a case where the user raises a document cover, places a document on a contact glass, lowers the document cover, and pushes a start key, for example, if such user operations are performed in a short time period, the document cover may be closed before the document size is detected. That is, even if the power circuit is switched back to the standby mode from the energy saving mode in response to the opening of the document cover, time is required for performing homing or AGC of the carriage and driving the carriage to the document size reading position, and thereby, the document cover may be closed before the document size can be detected.

SUMMARY OF THE INVENTION

According to a preferred embodiment of the present invention, a technique is provided for enabling immediate document size detection after switching back to standby mode from power-saving mode. According to another embodiment of the present invention, a technique is provided for maintaining high user operability.

In one specific embodiment of the present invention, an image reading apparatus is provided that includes:

an image sensor configured to convert image light of a document into an image signal;

an optical unit configured to project the image light of the document on the image sensor;

a drive unit configured to drive the optical unit in a sub scanning direction;

a document size detecting unit configured to detect a size of the document using the image signal;

an image signal processing unit configured to digitally convert the image signal of the image sensor into image data;

a power circuit configured to output an operating voltage in standby mode and stop the outputting of the operating voltage in sleep mode; and a power saving control unit configured to position the optical unit to a document size detecting position before switching the power circuit from the standby mode to the sleep mode.

According to an aspect of the present embodiment, since the optical unit is positioned at the document size detecting position before switching to sleep mode, the optical unit for projecting image light of the document on the image sensor does not have to be driven to the document size detecting position upon switching back to standby mode from sleep mode so that the document size may be immediately detected and high user operability may be maintained even when using a power circuit with a power saving mode.

The image reading apparatus according to a preferred embodiment of the present invention further includes:

a translucent plate configured to support the document;

a holding member configured to hold down the document placed on the translucent plate; and a downward movement detecting unit configured to detect a downward movement of the holding member moving towards the document placed on the translucent plate;

wherein the document size detecting unit is configured to detect the size of the document when the downward movement of the holding member is detected.

According to an aspect of the present embodiment, by detecting the downward movement of the holding member, the document size may be swiftly detected in the short period of time in which the holding member is lowered and closed so that high user operability may be maintained even when using a power circuit with a power saving mode.

The image reading apparatus according to a preferred embodiment of the present invention further includes:

an upward movement detecting unit configured to detect an upward movement of the holding member moving away from the document placed on the translucent plate;

wherein the power saving control unit is configured to switch the power circuit to the standby mode when the upward movement of the holding member is detected.

According to an aspect of the present embodiment, since the power circuit is switched back to standby mode when the holding member is raised and opened, a document may be placed and the holding member may be closed immediately therafter in a short period of time so that high user operability may be maintained even when a power circuit with a power saving mode is used.

The image reading apparatus according to another preferred embodiment of the present invention further includes:

a reference point sensor arranged at a predetermined position with respect to the sub scanning direction and configured to detect the optical unit;

wherein the drive unit is configured to drive the optical unit towards a sub scanning drive start position after the document size detecting unit detects the size of the document, and initialize sub scanning position information of the optical unit to information representing the predetermined position of the reference point sensor with respect to the sub scanning direction when the reference point sensor detects that the optical unit has reached the predetermined position.

According to an aspect of the present embodiment, document size detection may be performed ahead of time in consideration of the time required for initializing the sub scanning position information of the optical unit so that high user operability may be maintained even when using a power circuit with a power saving mode. Also, since the sub scanning position information is initialized after document size detection, the optical unit may be accurately positioned with respect to the sub scanning direction.

The image reading apparatus according to another preferred embodiment of the present invention further incldues:

a reference point sensor arranged at a predetermined position with respect to the sub scanning direction and configured to detect the optical unit;

wherein when an external power source is connected to the power circuit, the power saving control unit is powered by the power circuit and sets the power circuit to the standby mode, and the drive unit drives the optical unit towards a sub scanning drive start position and initializes sub scanning position information of the optical unit to information representing the predetermined position of the reference point sensor with respect to the sub scanning direction when the reference point sensor detects that the optical unit has reached the predetermined position.

According to an aspect of the present embodiment, when power is supplied to the power circuit as a result of an external power source being connected to the power circuit, the actual sub scanning position of the optical unit may be deviated from the sub scanning position information due to mechanical oscillation during external power shutdown, manual maneuvering of the optical unit during maintenance, or test driving, for example. Thus, by initializing the sub scanning position information, the sub scanning position information may be arranged to accurately represent the position of the optical unit.

In another preferred embodiment of the present invention, after the sub scanning position information of the optical unit is initialized, the image signal processing unit drives the optical unit to a reference white plate reading position for reading a reference white plate, reads the reference white plate, and updates digital conversion parameters including an image signal amplification gain used for digitally converting the image signal of the image sensor into the image data.

The image reading apparatus according to another preferred embodiment of the present invention further includes:

a translucent plate configured to support the document;

a holding member configured to hold down the document placed on the translucent plate; and an open/closed state detecting unit configured to detect an open/closed state of the holding member with respect to the translucent plate;

wherein the power saving control unit includes a detection circuit configured to detect a change in the open/closed state detection of the open/closed state detecting unit while the power circuit is in the sleep mode, and switch the power circuit to the standby mode upon detecting the change in the open/closed state detection.

The image reading apparatus according to another preferred embodiment of the present invention further includes:

a sheet-through reading conveying unit configured to convey the document in a direction traversing a sheet-through reading range of the optical unit in the sub scanning direction which sheet-through reading range is realized when the optical unit is positioned at a sheet through reading position.

The image reading apparatus according to another preferred embodiment of the present invention further includes:

a translucent plate configured to support the document;

a holding member configured to hold down the document placed on the translucent plate;

an open/closed state detecting unit configured to detect an open/closed state of the holding member with respect to the translucent plate;

a reference point sensor arranged at a predetermined position with respect to the sub scanning direction and configured to detect the optical unit; and a document feeding unit including a document tray configured to accommodate the document, a sheet-through reading conveying unit configured to convey the document placed in the document tray in a direction traversing a sheet-through reading range of the optical unit in the sub scanning direction which sheet-through reading range is realized when the optical unit is positioned at a sheet-through reading position, and a document sensor configured to detect the document placed in the document tray;

wherein the power saving unit includes a signal generating unit configured to generate a signal indicating whether the outputting of the operating voltage by the power circuit is caused by an external power source being connected to the power circuit or a switching of the power circuit from the sleep mode to the standby mode; and in a case where the signal indicates that the outputting of the operating voltage by the power circuit is caused by the switching of the power circuit from the sleep mode to the standby mode, the drive unit drives the optical unit towards a sub scanning drive start position if the open/closed state detecting unit detects that the holding member is in a closed state and the document sensor detects that the document is placed in the document tray, and initializes sub scanning position information of the optical unit to information representing the predetermined position of the reference point sensor with respect to the sub scanning direction when the reference point sensor detects that the optical unit has reached the predetermined position.

In another preferred embodiment of the present invention, in a case where the signal indicates that the outputting of the operating voltage by the power circuit is caused by the external power source being connected to the power circuit, the drive unit drives the optical unit towards the sub scanning drive start position, and initializes sub scanning position information of the optical unit to information representing the predetermined position of the reference point sensor with respect to the sub scanning direction when the reference point sensor detects that the optical unit has reached the predetermined position.

In another preferred embodiment of the present invention, after the sub scanning position information is initialized, the image signal processing unit drives the optical unit to a reference white plate reading position for reading a reference white plate, reads the reference white plate, and updates digital conversion parameters including an image signal amplification gain used for digitally converting the image signal of the image sensor into the image data.

In another preferred embodiment of the present invention, the reference white plate is positioned between the sub scanning drive start position and the document size detecting position.

In another preferred embodiment of the present invention, the reference point sensor and the reference white plate are positioned between the sub scanning drive start position and the document size detecting position.

In another preferred embodiment of the present invention, the reference point sensor is positioned between the sub scanning drive start position and the document size detecting position.

In another preferred embodiment of the present invention, the sheet-through reading position corresponds to the sub scanning drive start position.

According to another embodiment of the present invention, an imaging apparatus is provided that includes:

an image reading apparatus according to an embodiment of the present invention;

an image data processing unit configured to convert the read image data generated by the image reading apparatus into printer image data;

a printer configured to print an image represented by the printer image on a recording medium;

an input unit configured to input a document reading command for the image reading apparatus and a printing command for the printer; and a control unit configured to control document reading executed by the image reading apparatus and printing executed by the printer in response to the document reading command and the printing command.

According to a preferred embodiment of the present invention, the printer corresponds to an electrophotographic printer that is configured to form a toner image on a photoconductor, transfer the toner image onto the recording medium, and fix the toner image transferred onto the recording medium using a fixer; and the power circuit is associated with a plurality of loads including the fixer and is configured to be switched between the standby mode in which power is supplied to all of the loads, a low-power mode in which power is supplied to the loads other than the fixer, and the sleep mode in which power is only supplied to an input operation detecting unit configured to detect an input operation and set the power circuit to the standby mode in response to the input operation.

The imaging apparatus according to another preferred embodiment of the present invention further includes:

a storing unit configured to store a first switching waiting time Td1 for switching from the standby mode to the low-power mode, and a second switching waiting time Td2 for switching from the low-power mode to the sleep mode;

wherein the power saving control unit is configured to switch the power circuit from the standby mode to the low-power mode when the power circuit is set to the standby mode for a time period corresponding to the first switching waiting time Td1 without detecting any input operation, and switch the power circuit from the low-power mode to the sleep mode when the power circuit is set to the low-power mode for a time period corresponding to the second switching waiting time Td2 without detecting any input operation.

According to another preferred embodiment of the present invention, the printer corresponds to a color printer that includes plural imaging units for forming color images in different colors according to the electrophotographic method.

In another preferred embodiment of the present invention, the printer corresponds to an inkjet printer configured to spray ink on the recording medium;

the power circuit is associated with a plurality of loads and is configured to be switched between the standby mode in which power is supplied to all of the loads, and sleep mode in which power is only supplied to an input operation detecting unit configured to detect an input operation and set the power circuit to the standby mode in response to the input operation.

The imaging apparatus according to another preferred embodiment of the present invention further includes:

a storing unit configured to store a switching waiting time for switching from the standby mode to the sleep mode;

wherein the power saving control unit is configured to switch the power circuit from the standby mode to the sleep mode when the power circuit is set to the standby mode for a time period corresponding to the switching waiting time without detecting any input operation.

In another preferred embodiment of the present invention, the printer corresponds to a color printer that includes plural inkjet recording heads for forming color images in different colors.

DESCRIPTION OF THE PREFERRED EMBODIMENTS

In the following, preferred embodiments of the present invention are described with reference to the accompanying drawings.

First Embodiment

Figure 1:
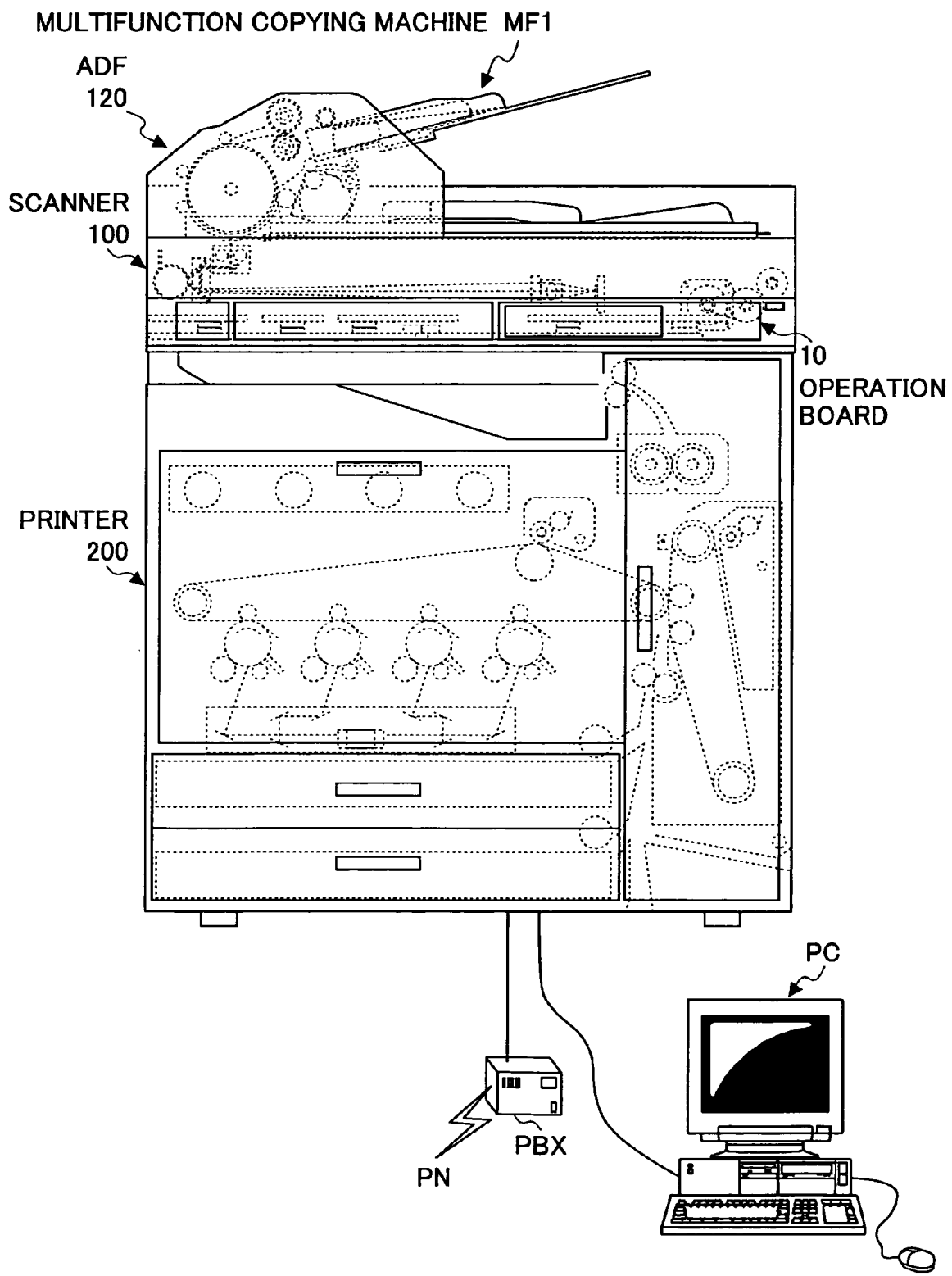
FIG. 1 is a cross-sectional diagram showing a configuration of a multifunction copying machine according to a first embodiment of the present invention.

FIG. 1 is a diagram illustrating a full color digital multifunction copying machine MF1 according to a first embodiment of the present invention. The full color copying machine MF1 according to the present embodiment includes an automatic document feeder (ADF) 120, an operations board 10, a color scanner 100, and a color printer 200, for example. In the illustrated example, the operations board 10 and the color scanner 120 with the ADF 120 attached thereto may be detached from the printer 200. The color scanner 100 includes a control board including a power driver or a sensor input and a controller, for example, and is configured to directly or indirectly establish communication with an engine controller (e.g., CPU 301 of FIG. 5) to have its timing controlled in reading a document image.

It is noted that in the illustrated example, an engine 300 (see FIG. 5) including the scanner 100, the printer 200, and an image input/output processing apparatus 302 (see FIG. 5) is connected to a controller board 400 (see FIG. 5), which in turn is connected to a LAN (local area network) that is connected to a personal computer PC (see FIG. 1). Also, a facsimile control unit (FCU) 417 is connected to an exchanger PBX, which in turn is connected to a phone line (facsimile communications line) PN (see FIG. 1).

Figure 2:
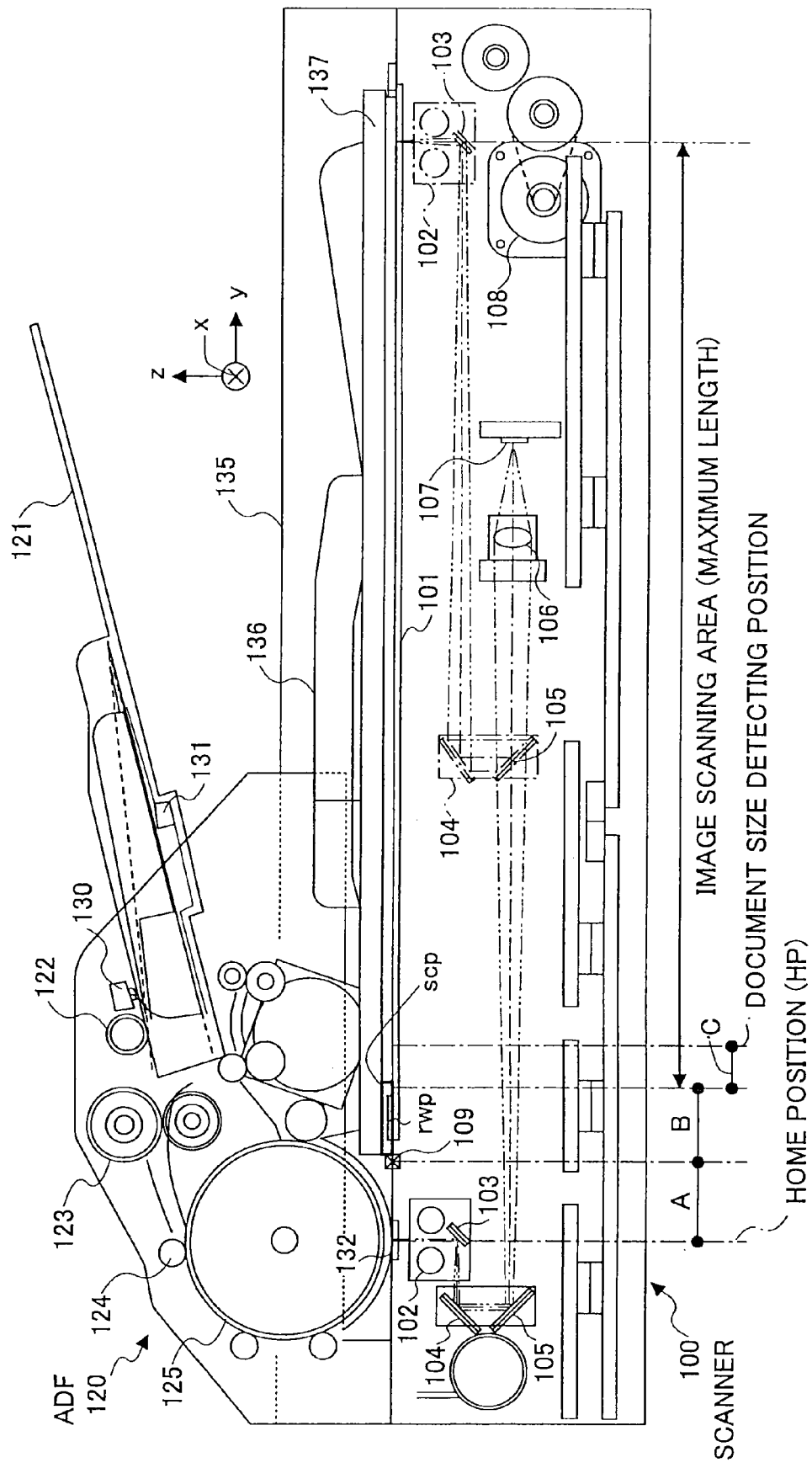
FIG. 2 is a cross-sectional diagram showing configurations of a color scanner and an automatic document feeder (ADF) of the multifunction copying machine of FIG. 1.

FIG. 2 is a diagram showing a configuration of a document image reading mechanism of the scanner 100 and the ADF 120 attached thereto of the multifunction copying machine MF1. A document placed on a contact glass 101 of the scanner 100 is irradiated with light by a lamp 102, and the reflected light of the document (image light) is reflected by a first mirror 103 to be directed parallel to a sub scanning direction y. It is noted that the lamp 102 and the first mirror 103 are arranged in a first carriage (not shown) that is driven at a constant speed in the sub scanning direction y. A second mirror 104 and a third mirror 105 are included in a second carriage (not shown) that is driven in the same direction as the first carriage at a speed ½ the drive speed of the first carriage. It is noted that the first carriage and the second carriage may realize an optical unit according to an embodiment of the present invention. The image light reflected by the first mirror 103 is reflected by the second mirror 104 to be directed downward (z direction) after which the image light is reflected by the third mirror 105 to be directed in the sub scanning direction y and condensed by a lens 106 after which the condensed light is irradiated on a CCD 107 to be converted into electric signals. Specifically, the image light is converted into RGB color image signals.

The first and second carriages are driven by a running motor 108 to move forward (document scanning direction) and backward (returning direction) in the sub scanning direction y. In the illustrated example, the scanner 100 is configured to perform flat-bed document reading that involves reading a document placed on the contact glass 101 by the lamp 102 and the mirror 103, and projecting the document image onto the CCD 107. Also, the scanner 100 is configured to position the first carriage at a home position (sub scanning drive start position) HP to perform sheet-through reading.

In the illustrated example, the ADF 120 is attached to the scanner 100 in order to enable sheet-through reading, and a glass 132 corresponding to a sheet-through reading window is arranged at a reading range position of the first mirror 103 when the first carriage is held at the home position HP. The glass 132 is arranged to face a transfer drum (plate) 125 of the ADF 120.

Documents stacked on a document tray 121 of the ADF 120 are detected by a filler sensor 130. The document size is determined by the on/off states of a group of switches 131 configured to detect the positions of side plates that guide a document in a predetermined orientation. In performing sheet-through reading, the uppermost document of the documents stacked on the document tray 121 of the ADF 120 is conveyed to the transfer drum 125 by a pickup roller 122 and transfer rollers 123 and 124 after which the document is transferred to the window glass 132 by the transfer drum 125. At this point, image light of the document is reflected by the first mirror 103 positioned at the home position HP and is then reflected by the second mirror 104 to be projected on the CCD 107, and the CCD 107 performs optical-electric conversion of the projected image to generate image signals; namely, RGB color image signals.

In the present embodiment, the home position HP corresponds to a sheet-through reading position for the first carriage corresponding to an image reading optical component as well as a first carriage drive start position (returning position) for flat-bed reading. In the case of flat-bed reading, the first carriage is driven from the home position HP to be positioned away from the home position HP by a distance A+B (i.e., right edge of scale scp; flat-bed reading start position), and document image reading is started at this position. Specifically, the image signal generated by the CCD 107 is validated starting from the flat-bed reading start position. It is noted that a reference point sensor 109 for detecting the first carriage and a reference white plate rwp are arranged between the home position HP and the flat-bed reading start position. The reference white plate rwp is adhered to the upper surface of a left side portion of the contact glass 101. The reference white plate rwp is configured to correct (through shading correction) deviations in read data that may be caused by variations in the light emitting intensities of the light emitting elements of the lamp 102, deviations in the main scanning direction x, and variations in sensitivity of the pixels of the CCD 107, for example. Also, the reference white plate rwp may be used for realizing AGC on the image signals.

In flat-bed reading, sub scanning driving and sub scanning position tracking of the first carriage are started from the home position HP. When the reference white plate rwp is within the reading range of the first carriage, the image signals (i.e., digitally converted image data) of the CCD 107 are read by an image signal processing unit 111 (see FIG. 5). When the first carriage passes the reference point sensor 109, active driving of the first carriage is ended and the scanning speed is stabilized to a predetermined value. When the sub scanning position reaches the flat-bed reading start position (i.e., A+B: right side edge of the scale scp), an image signal validation signal (frame synchronization signal: FGATE) is switched to valid level. In flat-bed reading, the first carriage is driven in the sub scanning direction to reach the front edge (right edge) of the document placed on the contact glass 101, and then driven back in the returning direction to be temporarily stopped at the home position HP. It is noted that the reference point sensor 109 detects the first carriage right before the first carriage is driven back to the home position HP to be stopped thereat, and in response to the detection of the first carriage by the reference point sensor, the sub scanning position information of the first carriage is initialized to reference point position data (predetermined value) representing the position of the reference point sensor 109 with respect to the sub scanning direction. After temporarily stopping at the home position, the first carriage is moved to a document size detecting position (i.e., A+B+C) to be on standby.

Figure 3:
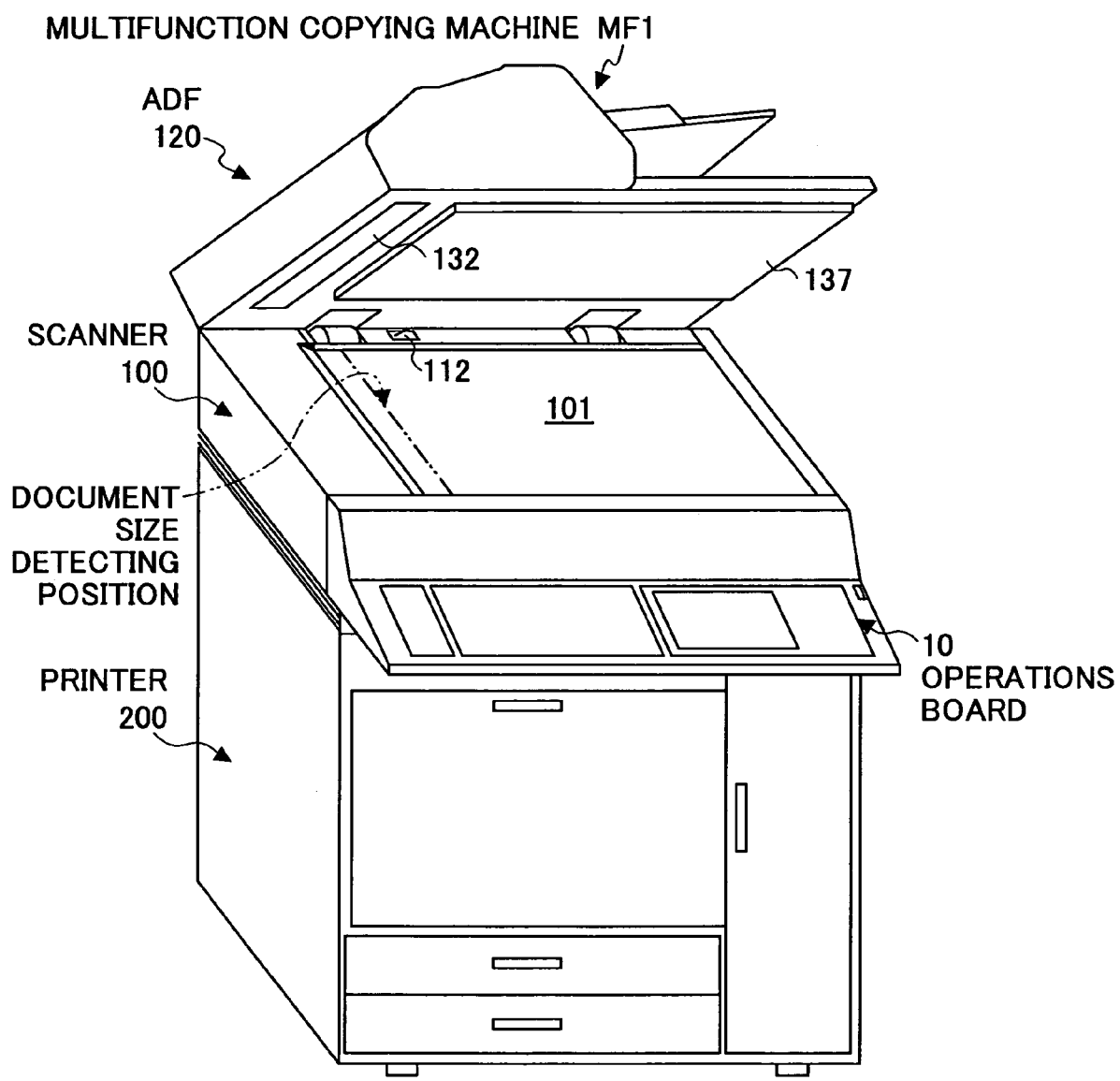
FIG. 3 is a perspective view of the multifunction copying machine of FIG. 1 in which the ADF is raised and opened.

A base frame 135 of the ADF 120 is hinge-connected to a base frame of the scanner 100 at a rear side, and a handgrip 136 is arranged at a front side of the base frame 135 so that the ADF 120 may be opened by raising the handgrip 136 as is illustrated in FIG. 3. A cover switch 112 for detecting the open/closed state of the ADF 120 is arranged at the rear side of the base frame 135 of the ADF 120. In the present embodiment, during the process in which the ADF 120 is raised to an upright position as is shown in FIG. 3 from a reclined position as is shown in FIG. 1, when the angle of the lower surface of a cover (document holding plate) 137 with respect to the document positioning surface of the contact glass 101 exceeds a predetermined angle of approximately 30 degrees, the cover switch 112 is configured to be switched from an off state representing a cover closed state to an on state representing a cover open state. On the other hand, during the process in which the ADF 120 is lowered to the reclined position from the upright position, when the angle of the lower surface of the cover 137 with respect to the document positioning surface of the contact glass 101 becomes less than or equal to the predetermined angle, the cover switch 112 is configured to be switched from an on state representing the cover open state to an off state representing the cover closed state.

It is noted that the on/off detection switching angle (predetermined angle) for the cover switch 112 is preferably arranged to be a relatively wide angle of approximately 30 degrees so that when the angle of the cover 137 falls below the predetermined angle, the lamp 102 included in the first carriage positioned at the document size detecting position beforehand (see FIGS. 2 and 3) may be turned on to irradiate light on the document placed on the contact glass 101, and the document image may be projected onto the CCD 107 to enable detection of the boundary between the document and the background thereof; namely, the document side edges (the document width in the main scanning direction x) based on the image signal of the CCD 107. When the inclined angle of the ADF 120 is approximately 10 degrees or greater, the light of the lamp 102 may be reflected by the document placed on the contact glass 101 to reach the CCD 107, which detects the document area as a bright area. On the other hand, the light of the lamp 102 that is not reflected by the document is reflected by the lower surface of the cover 137. Since the lower surface of the cover 137 is inclined, most of the light reflected by the lower surface of the cover 137 is directed outside the optical detection range of the CCD 107, and thereby, the outside area of the document is detected as a dark area (i.e., substantially no light is detected by the CCD 107). It is noted that the size of a document placed on the contact glass 101 may be detected by document size detection 48 (see FIG. 6) based on such a difference in brightness between the document and its background.

In the following, exemplary image reading operations that may be performed according to an embodiment of the present invention are described.

1. Manual Document Reading

In manual document reading, a user raises the ADF 120, places a document on the contact glass 101, lowers the ADF 120 so that the cover 137 holds down the document, and operates the scanner 100 to perform flat-bed document scanning (flat-bed reading). In this case, when the first carriage passes a position right below the reference white plate rwp, shading correction data are generated based on read image data of the reference white plate rwp, and shading correction data stored in a memory are updated to the generated shading correction data. When the flat-bed reading is ended, the user raises the ADF 120 and removes the document. It is noted that the size of the document placed on the contact glass 101 is detected by the document size detection 48 (see FIG. 6) at the time the user closes the ADF 120 after placing the document on the contact glass 101.

2. Sheet-Through Reading

At the ADF 120, a document placed on the tray 121 is transferred therefrom to be scanned through sheet-through reading as is described above. Upon transferring the document from the tray 121, the first carriage is moved to the position of the reference white plate rwp and is then moved back to the home position HP. During such a driving operation, when the first carriage is positioned directly below the reference white plate rwp, shading correction data are generated based on the read image data of the reference white plate rwp, and the shading correction data stored in the memory are updated to the generated shading correction data. It is noted that the operations process as is described above is performed for each document that is placed on the tray 121.

Figure 4:
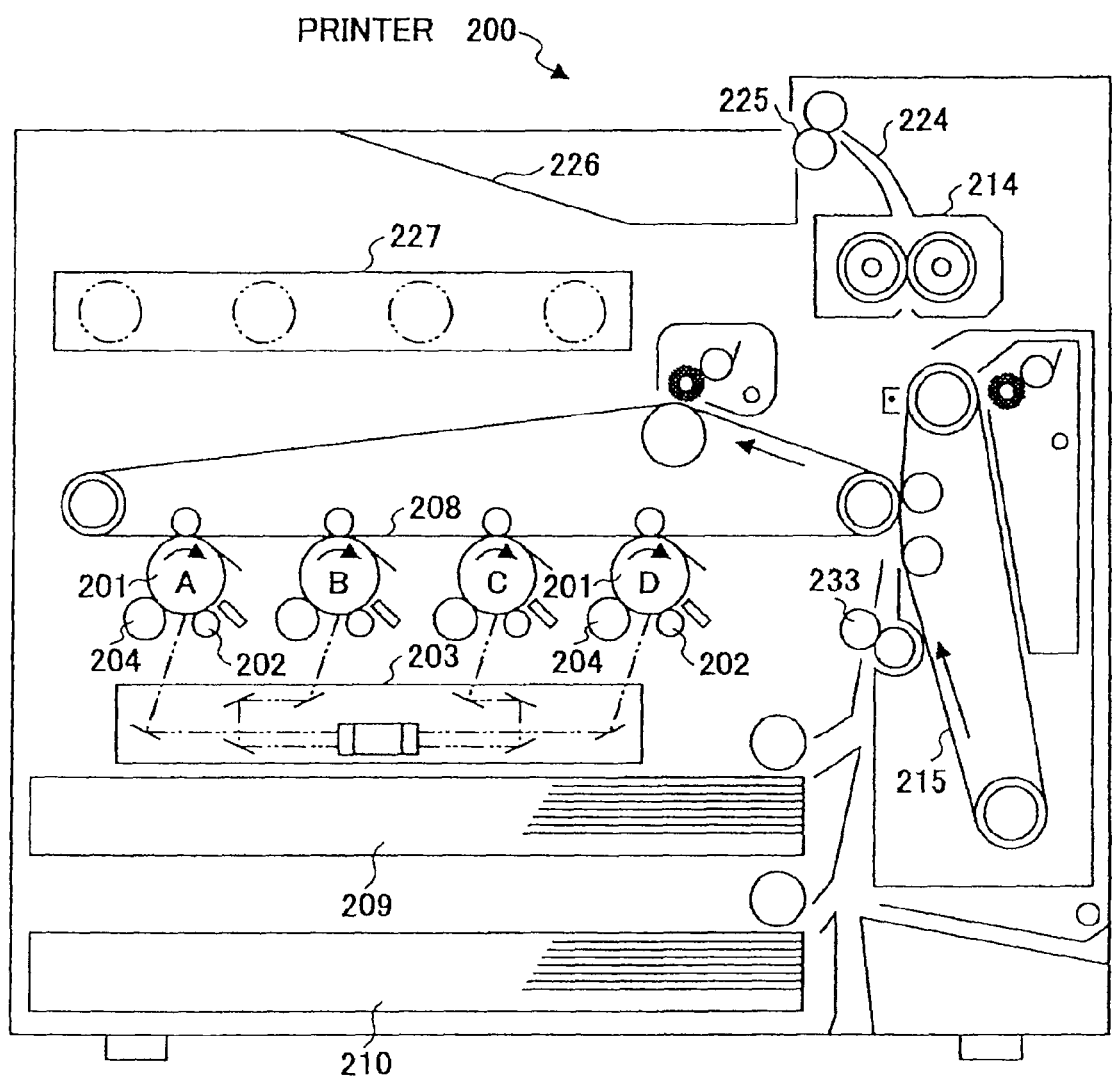
FIG. 4 is a cross-sectional diagram showing a configuration of a printer of the multifunction copying machine of FIG. 1.

FIG. 4 is a diagram showing a configuration of the color printer 200 of the multifunction copying machine MF1. In the illustrated example, the color printer 200 corresponds to a laser printer. The laser printer 200 of FIG. 4 includes four toner imaging units A-D that are configured to generate toner images in colors magenta (M), cyan (C), yellow (Y), and black (K), respectively, which toner imaging units A-D are arranged in this order along the moving direction of a first transfer belt 208 (from left to right in the horizontal direction in FIG. 4). As can be appreciated from the above descriptions, in the illustrated example, the color printer 200 corresponds to a four-drum tandem type full color imaging apparatus.

In the illustrated example, each of the toner imaging units A-D includes a photoconductor 201 supported to rotate in the direction of the indicated arrow, and peripheral components including a discharger, a cleaner, a charger 202, and a developer 204 that are arranged at the periphery of the photoconductor 201. A space is provided between the charger 202 and the developer 204 in order to enable entrance of light information generated by an exposure apparatus 203. As can be appreciated from the above descriptions, the four photoconductors 201 of the respective toner imaging units A-D are arranged to have substantially identical peripheral component structures. The toner imaging units A-D may be distinguished by the different color materials (toner) handled by their respective developers 204. In the present example, a portion of each of the four photoconductors 201 is arranged to be in contact with the first transfer belt 208. In another example, a belt type photoconductor may be used.

The first transfer belt 208 is arranged around a support roller and a drive roller to move in the direction of the indicated arrow. First transfer rollers as exemplary first transfer means are arranged on the inner side of the first transfer belt 208 at positions close to the photoconductors 201, and a first transfer belt cleaner is arranged on the outer side of the first transfer belt 208. The first transfer belt cleaner removes toner remaining on the first transfer belt 208 after a toner image is transferred from the first transfer belt 208 to a recording medium such as a transfer paper sheet or a second transfer belt 215. The exposure apparatus 203 may be a conventional laser exposure apparatus that is configured to irradiate light information for full color imaging on a uniformly charged photoconductor surface as a latent image. It is noted that an exposure apparatus having an LED array and imaging means may also be used.

In the illustrated example of FIG. 4, the second transfer belt 215 is arranged at the right side of the first transfer belt 208. The first transfer belt 208 and the second transfer belt 215 are arranged to be in contact with each other to form a predetermined nip. The second transfer belt 215 is supported by a support roller and a drive roller to move in the direction of the indicated arrow, and second transfer units as exemplary second transfer means are arranged on the inner side of the second transfer belt 215. Further, a second transfer belt cleaner and a charger are arranged on the outer side of the second transfer belt 215. The second transfer belt cleaner is configured to remove toner remaining on the second transfer belt 215 after a toner image is transferred from the second transfer belt 215 to a recording medium such as a transfer paper sheet. In the illustrated example, transfer paper sheets are accommodated in paper feeding cassettes 209 and 210, and a paper feeding roller is configured to feed the uppermost sheet to a resist roller 233 via plural sheet guides. A fixer 214, a delivery guide 224, a delivery roller 225, and a delivery stack 226 are arranged at the upper side of the second transfer belt 215. Also, an accommodating unit 227 for accommodating toner supplies is arranged at the upper side of the first transfer belt 208 under the delivery stack 226. In the present example, toner colors magenta, cyan, yellow, and black are used in the form of toner cartridges. The toner may be supplied to a corresponding developer 204 by a powder pump, for example.

In the following, imaging operations for realizing dual side printing are described. First, image generation is performed at the photoconductors 201. Specifically, the exposure apparatus 203 is operated so that light from a LD light source (not shown) passes through an optical component (not shown) to reach the photoconductor 201 of the toner imaging unit A that is uniformly charged by the corresponding charger 202 and a latent image corresponding to the relevant write information (information according to the relevant color) is formed. The latent image formed on the photoconductor 201 is then developed by the developer 204 so that an actual toner image may be formed on the surface of the photoconductor 201. This toner image is then transferred by the first transfer means to the surface of the first transfer belt 208 that moves in sync with the photoconductor 201. Then toner remaining on the surface of the photoconductor 201 is cleaned by the cleaner arranged at its periphery, and discharged by the discharger to be ready for a next imaging cycle. The first transfer belt 208 moves in the indicated direction carrying the toner image transferred thereon.

A latent image of a different color is written on the photoconductor 201 of the toner imaging unit B, and a corresponding actual toner image is developed in a similar manner as is described above. Upon transferring the toner image formed by the toner imaging unit B to the first transfer belt 208, this toner image is layered on top of the toner image formed by the toner imaging unit A that is already transferred onto the first transfer belt 208. Toner images of the other colors are similarly formed on the photoconductors 201 of the toner imaging units C and D, respectively, and in this way, toner images of the four respective colors are layered on top of one another to form a color toner image on the first transfer belt 208. It is noted that in another example, a black/white toner image may be formed on the first transfer belt 208. The second transfer belt 215 moves in the indicated direction in sync with the first transfer belt 208, and the color (or black/white) toner image formed on the surface of the first transfer belt 208 is transferred to the surface of the second transfer belt 215 by the second transfer means. According to the present embodiment, toner images are formed on the photoconductors 201 of the four toner imaging units A-D according to the so-called tandem method while the first and second transfer belts 208 and 215 are moved. In this way, the imaging processing time may be reduced. When the first image transfer belt 208 is moved to reach a predetermined position, a color (or black/white) toner image to be formed on the other side of a transfer sheet is generated at the photoconductors 201 of the toner imaging units A-D in a similar manner as is described above, and a color toner image is formed on the surface of the first transfer belt 208. Then, paper feeding is started. An uppermost sheet of the sheets accommodated in the paper feeding cassette 209 or 210 is drawn out and conveyed to resist rollers 233. The sheet passes through the resist rollers 233 to enter the nip between the first transfer belt 208 and the second transfer belt 215 at which the toner image formed on the surface of the first transfer belt 208 is transferred to one side of the sheet by the second transfer means. The sheet is moved up further, and a toner image formed on the surface of the second transfer belt 215 is transferred to the other side of the sheet by the charger arranged at the outer side of the second transfer belt 215. It is noted that in the transfer process, the timing for conveying the sheet is adjusted so that the image may be transferred to the sheet at the appropriate position.

The sheet having toner images transferred on both of its sides through the above-described process is conveyed to the fixer 214 at which the toner images on both sides of the sheet are melted and fixed at the same time. Then, the sheet is conveyed through the delivery guide 224 and is delivered by the delivery rollers 225 to the delivery stack 226 at the upper portion of the printer main frame.

In the example of FIG. 4 that uses delivery units 224-226 as is described above, the sheet is delivered and stacked onto the delivery stack 226 in a manner such that the back side of the sheet, namely, the side of the sheet on which an image formed on the first transfer belt 208 is transferred faces downward. Thereby, in the case of printing pages in chronological order, for example, an image of a second page is generated before an image of a first page is generated, and the generated image of the second page is arranged to be carried by the second transfer belt 215. Then, the image of the first page is generated and transferred directly from the first transfer belt 208 to one side of the sheet. It is noted that in the present example, the image to be transferred directly from the first transfer belt 208 to the sheet is arranged to be formed through exposing a non-reversed image thereof on the photoconductor 201 surfaces, whereas the image to be transferred from the second transfer belt 215 to the sheet is arranged to be formed through exposing a reversed image (mirror image) thereof on the photoconductor 201 surfaces. Such image processes of controlling the image forming order for page organization and switching images to be formed between non-reversed images and reversed (mirror) images may be realized by write image storage controller 403 (see FIG. 5) controlling reading/writing of image data from/on a memory 406. After the image is transferred from the second transfer belt 215 to the sheet, a cleaner including a brush roller, a collecting roller, an a blade, for example, removes toner and paper particles remaining on the surface of the second transfer belt 215.

In FIG. 4, the brush roller of the cleaning unit of the second transfer belt 215 is shown at a position distanced away from the surface of the second transfer belt 215. However, it is noted that in the present example, the brush is arranged to swing back and forth with respect to a supporting point to come into contact with the surface of the second transfer belt. Specifically, the brush roller may be at a detached position from the surface of the second transfer belt 215 before a toner image is transferred onto a sheet; that is, while the second transfer belt 215 still carries the toner image. The brush roller may be swung in a counterclockwise direction in to come into contact with the surface of the second transfer belt 215 when cleaning is desired or necessary; that is, after the toner image is transferred from the second transfer belt 215 to the sheet. The toner removed from the surface of the transfer belt 215 may be accumulated in a toner container, for example. It is noted that 'dual side transfer mode' is set when dual side printing is to be performed, and the imaging operations process as is described above may be performed to realize such dual side printing.

On the other hand, in the case of performing single side printing, the printing may be performed by setting the printing mode to one of 'single side transfer by second transfer belt 215 mode' or 'single side transfer by first transfer belt 208 mode'. In the case where the single side transfer mode using the second transfer belt 215 is selected, an actual toner image of four colors, three colors or a single color, for example, formed on the first transfer belt 208 is transferred to the second transfer belt 215 to then be transferred onto one side of a sheet. In this case, no image is transferred on the other side of the sheet, and when the printed sheet is delivered to the delivery stack 226, the side of the sheet with the print image transferred thereon is arranged to face upward (i.e., the upper side of the sheet corresponds to the printed side).

In the case where the single side transfer mode using the first transfer belt 208 is selected, an actual toner image of four colors, three colors or a single color, for example, formed on the first transfer belt 208 is not transferred to the second transfer belt 215, and is directly transferred onto one side of a sheet. In this case, no image is transferred onto the other side of the sheet, and when the sheet is delivered to the delivery stack 226, the side of the sheet on which the print image is transferred is arranged to face downward (i.e., the lower side of the sheet corresponds to the printed side).

Figure 5:
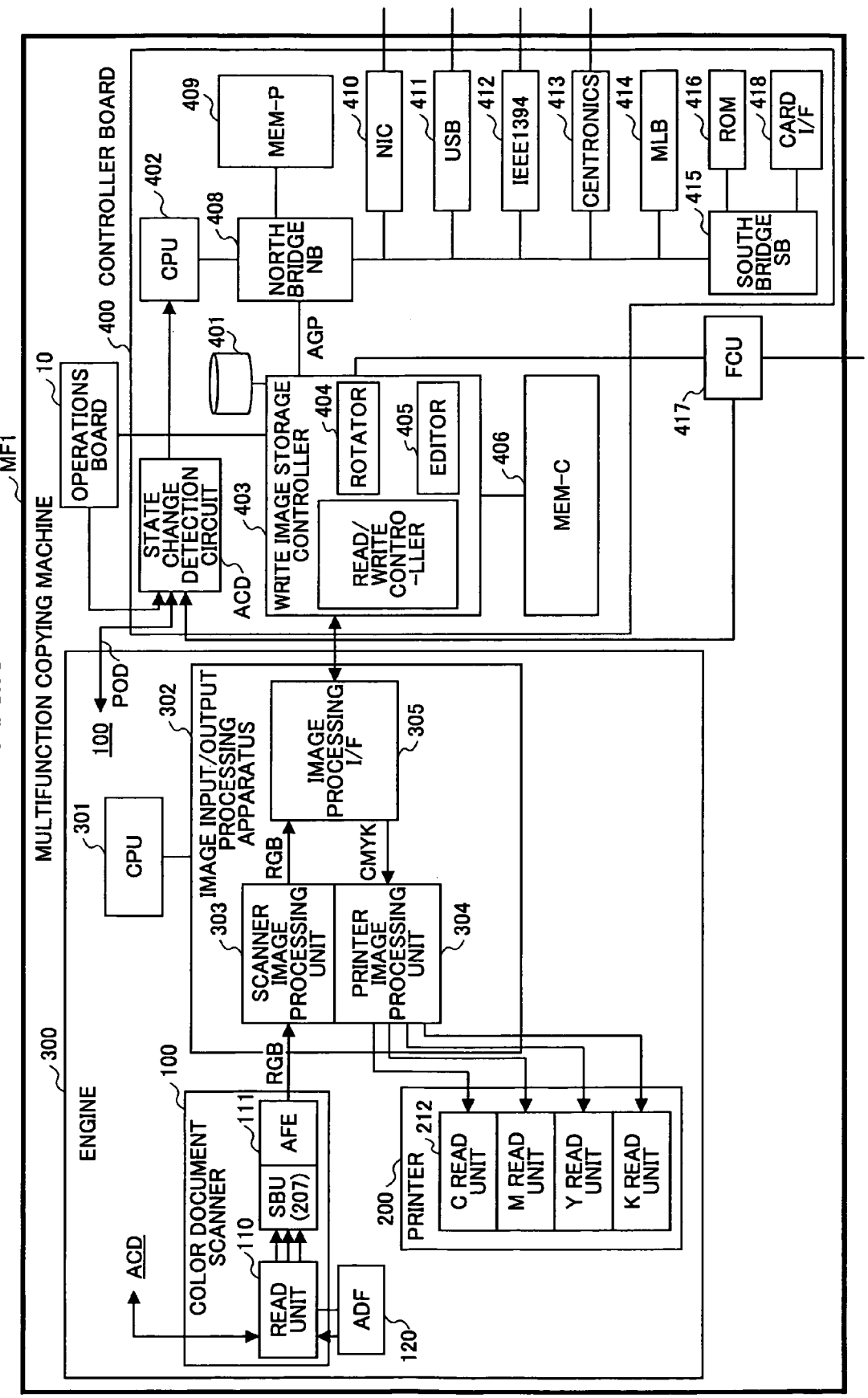
FIG. 5 is a block diagram showing a configuration of an image processing system of the multifunction copying machine of FIG. 1.

FIG. 5 is a block diagram showing a configuration of an image processing system of the multifunction copying machine MF1 of FIG. 1. In this drawing, the multifunction copying machine MF1 includes an engine 300 for realizing document image reading and color printing, a controller board 400, and the operations board 10. The engine 300 includes a CPU 301 for controlling image reading and printing processes, the color scanner 100, the printer 200, and an image input/output processing apparatus 302 including an ASIC (Application Specific IC).

The scanner 100 includes a read unit 110 as a drive unit and a document size detecting unit according to an embodiment of the present invention. The read unit 110 includes a CPU, a ROM, and a RAM, and is configured to control overall operations of the scanner 100 via the CPU that writes programs stored in the ROM onto the RAM and executes the programs written in the RAM. Also, the read unit 110 is connected to the CPU 301 of the engine 300 via a communications line, and is configured to execute operations according to commands and data transmitted/received to/from the CPU 301. The CPU of the read unit 110 is configured to control detection and on/off operations of a filler sensor (document detection sensor), a reference point sensor, a cover switch, and a cooling fan, for example. Further, the read unit 110 includes a scanner motor driver that is driven by a PWM signal output from the CPU of the read unit 110 to generate an excitation pulse sequence for driving a document scanning drive pulse motor.

A document is irradiated by light output from a halogen lamp 102 powered by a lamp regulator (see FIG. 2), and a light signal corresponding to the reflected light of the document is directed to the plural mirrors 103-105 and the lens 106 to be imaged at the CCD 107 that includes three line sensors for reading R, G, and B light components, respectively. The three-line CCD 107 outputs analog R, G, B image signals of pixels to a digital processing circuit (AFE) 111. The AFE 111 is configured to amplify the image signals, digitally convert the image signals into image data, and perform shading correction on the image data.

The controller board 400 includes a CPU 402, a write image storage controller 403 including an ASIC, a hard disk drive (HDD) 401, a local memory (MEM-C) 406, a system memory (MEM-P) 409, a North Bridge (NB) 408, a South Bridge (SB) 415, a network interface card (NIC) 410, a USB device 411, an IEEE 1394 device 412, and a Centronics device 413, and a media link board (MLB) 414, for example. The operations board 10 is connected to the write image storage controller 403 of the controller board 400. Also, a facsimile control unit (FCU) 417 is connected to the write image storage controller 403 via a PCI bus.

The CPU 402 is capable of exchanging write image information with a personal computer (PC) connected to the LAN via the NIC 410 or some other personal computer (PC) connected via the Internet, for example. Also, the CPU 402 is capable of establishing communication with apparatuses such as a PC, a printer, or a digital camera using the USB 411, the IEEE 1394 device 412, and the Centronics device 413, for example.

The SB 415, the NIC 410, the USB device 411, the IEEE 1394 device 412, the Centronics device 413, and the MLB 414 are connected to the NB 408 via a PCI bus. The MLB 414 corresponds to a substrate for realizing connection with the engine 300 via a PCI bus. The MLB 414 is configured to convert write image data input from an external unit into image data and output the converted image data to the engine 300.

It is noted that component elements of the controller board 400 such as the local memory 406 and the HDD 401 are connected to the write image storage controller 403, and the CPU and the write image storage controller 403 are interconnected via the NB 408 corresponding to a CPU chipset. The write image storage controller 403 and the NB 408 are interconnected via an AGP (Accelerated Graphics Port).

The CPU 402 is configured to control overall operations of the multifunction copying machine MF1. The NB 408 is configured to interconnect the CPU 402, the system memory 409, the SB 415, and the write image storage controller 403. The system memory 409 may be used as a depiction memory of the multifunction copying machine MF1, for example. The SB 415 is configured to interconnect the NB 408, the PCI bus, and peripheral devices. Also, the SB 415 is connected to an external ROM and a card interface (I/F) 418 that reads/writes data from/on a SD memory card (SD card), and is capable of reading data from or writing data on an SD card that is inserted into a card reader, for example.

The local memory 406 may be used as a copying image buffer and/or a code buffer, for example. The HDD 401 may be used for storing data including image data, text data, programs, font data, forms, LUT (look up table), for example. The operations board 10 is configured to receive operations input from a user and display information directed to the user.

In FIG. 5, the flow of image data being exchanged between the scanner 100, the printer 200, and the image input/output processing apparatus 302 is illustrated. The image input/output processing apparatus 302 includes a scanner image processing unit 303 that performs read γ correction on R, G, B image data that are generated by the scanner 100 that reads a document image; a printer image processing unit 304 that converts the R, G, B image data into c, m, y, k recording color data (print data) that are compatible with the image representation characteristics for image writing in the colors C, M, Y, and K of the printer 200; and an image processing I/F 305 that outputs document read image data RGB to the write image storage controller 403, and inputs the image data RGB output by the write image storage controller 403 to the printer image processing unit 304.

In the case of performing black/white copying, the scanner image processing unit 303 outputs G image data to the image processing I/F 305; the image processing I/F 305 outputs the G data to the printer image processing unit 304; and the printer image processing unit 304 converts the G data into k recording color data (print data), performs further image processing such as scaling as is necessary or desired, then performs printer γ conversion and halftone processing on the print data; and outputs the resulting print data to a C write unit 212 of the printer 200. The C write unit 212 turns on/off or modulates a current supplied as power to a laser diode of the optical scanning unit 203 shown in FIG. 4 according to the k recording color data output by the printer image processing unit 304.

In the case of performing color copying, RGB image data output by the scanner image processing unit 303 are passed on to the image processing I/F 305 and the image storage controller 403 to be temporarily stored in the local memory 406 or the HDD 401 or registered in the HDD 401. Then, the stored/registered RGB image data may be read to be used for copying or printing, or to be transmitted to an external unit, for example.

When the printer 200 is to print registered image data or image data received from an external unit, the corresponding print data are supplied to the printer image processing unit 304 via the write image storage controller 403 and the image processing I/F 305. The printer image processing unit 304 converts the image data into cmyk recording color data, performs further image processing such as scaling as is necessary or desired, then performs printer γ conversion and halftone processing, and outputs the resulting print data to the C, M, Y, K write units 212.

It is noted that detection signal lines of the cover switch 112 of the read unit 110 and the filler sensor of the ADF 120, a key operations detection signal line of a power key switch 21 of the operations board 10, and a reception detection signal line of the facsimile controller unit 417 are connected to a state change detection circuit ACD of the controller board 400. It is noted that an operating voltage +5 VE is applied to the state change detection circuit ACD, which operating voltage is constantly output throughout the time a main switch 79 (see FIG. 10) is turned on, even when a power circuit 80 (see FIG. 10) is in sleep mode. As long as the operating voltage +5 VE is applied to the detection circuit ACD, a state change detection signal may be generated and supplied to the CPU 402 when there is any signal change occurring at one or more of the signal lines connected to the detection circuit ACD. Upon receiving the detection signal from the detection circuit ACD, the CPU 402 may switch the power circuit 80 to standby mode, for example.

The state change detection circuit ACD includes a power-on resetting circuit that generates a resetting pulse when the operating voltage +5 VE is applied in sleep mode (i.e., when the main switch 79 is switched from off mode to on mode); and a latch (flip-flop) that is reset by the resetting pulse to thereby output a power-on mode signal POD (Q output) that is set to low-level L ('0'). When the CPU 402 switches the power circuit 80 from sleep mode to standby mode, the latch is configured to output a power-on mode signal that is switched to high-level H ('1') (see step 6a of FIG. 11). It is noted that the signal value '0' as the power-on mode signal POD signifies that the power circuit 80 has been set to standby mode in response to the switching of the main switch 79 from off mode to on mode. The signal value '1' as the power-on mode signal POD signifies that the power circuit 80 has been switched from sleep mode to standby mode. The power-on mode signal POD is referred to by the document scanner 100 when an operating voltage is applied to the document scanner in order to determine whether the operating voltage has been applied in response to the main switch 79 being switched on or the switching of the power circuit 80 from sleep mode to standby mode by the CPU 402 (see step 22 of FIG. 13).

Figure 6:
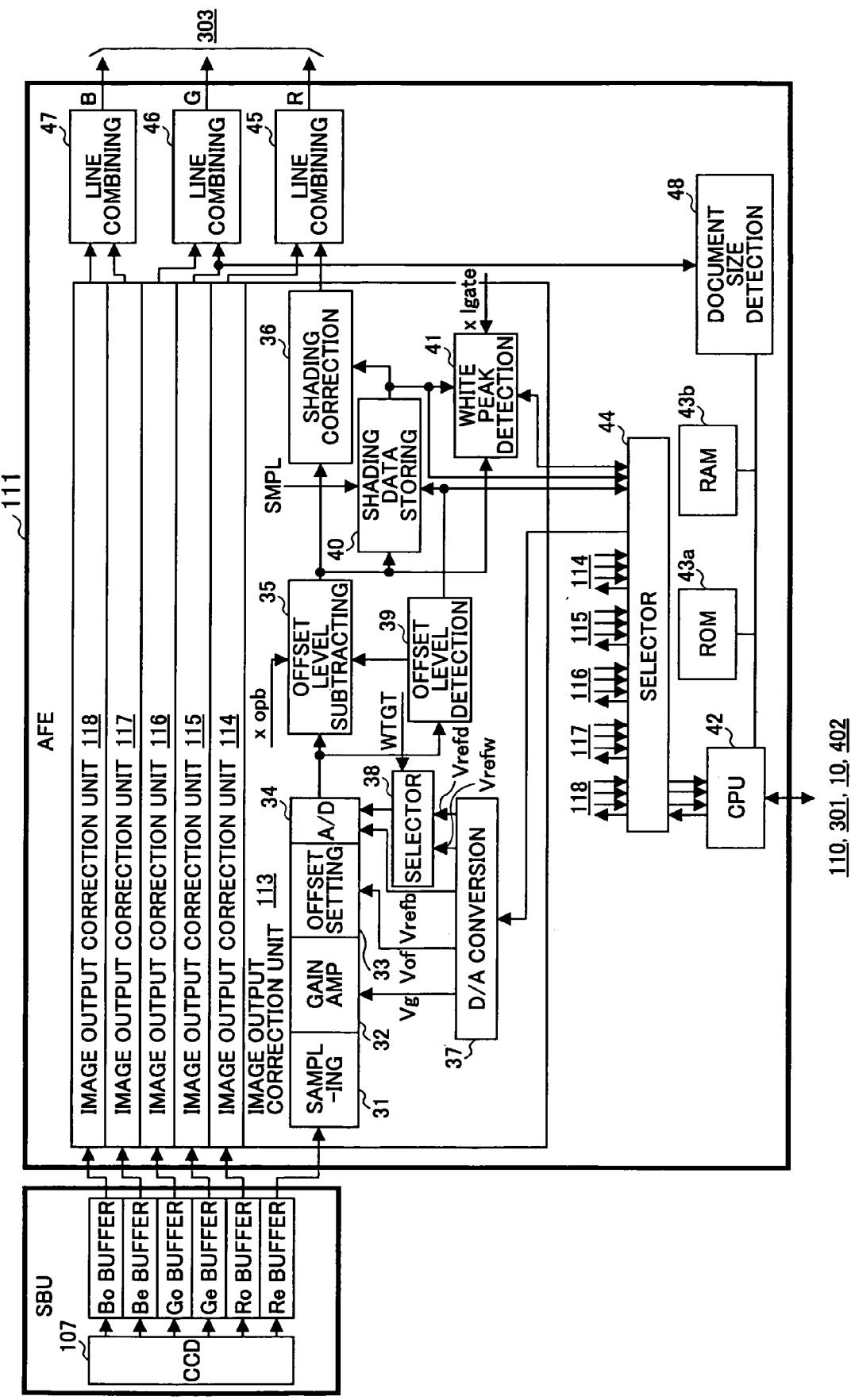
FIG. 6 is a block diagram showing a configuration of an image signal processing circuit (AFE) of the image processing system of FIG. 5.

FIG. 6 is a block diagram illustrating image signal processing functions of a sensor board unit SBU and the AFE 111 of the color scanner 100. The CCD 107 divides its R, G, and B image signal outputs into even numbered pixel arrays and odd numbered pixel arrays, respectively, and outputs the divided image signals in parallel. The even numbered pixel arrays and the odd numbered pixel arrays of the respective color image signals are individually amplified at their corresponding buffer amplifiers, and output to image output correction units 113-118 of the AFE 111, respectively. It is noted that FIG. 6, only shows the functions of the image output correction unit 113 for converting even numbered pixel array of R image signals into digital data; however, the other image output correction units 114-118 may have similar functions as those of the image output correction unit 113. Thus, in the following, the functional configuration of the image output correction unit 113 is described as a representative example.

Analog image signals of the R color even numbered pixel array that are output by the CCD 107 are amplified at the Re buffer amplifier of the SBU and supplied to a sampling circuit 31 that samples and holds the image signals and removes high frequency components such as reset noise therefrom. A variable gain amplifier 32 is configured to control a gain at a control voltage Vg that is applied to its control terminal. An offset setting circuit 33 is configured to set positive and negative offset levels at a control voltage Vof that is applied to its control terminal. It is noted that the control voltages Vg and Vof are determined by a CPU 42 operating a D/A conversion circuit 37. For example, if the D/A conversion circuit 37 is an 8-bit D/A conversion circuit, the CPU 42 may set a value selected from values 0-255 to the D/A conversion circuit 37, and in turn, the D/A conversion circuit 37 may output a corresponding voltage.

An A/D conversion circuit 34 is configured to convert analog image signals into digital image signals, namely, image data, at a predetermined resolution (e.g., 8 bits) based on a maximum (upper) reference value Vrefd/Vrefw and a minimum (lower) reference value Vrefb. The converted image data are input to an offset level detection circuit 39 and an offset level subtracting circuit 35. It is noted that the maximum reference value Vrefd/Vrefw and the minimum reference value Vrefb are determined by the CPU 42 operating the D/A conversion circuit 37. Maximum reference value outputs Vrefw and Vrefd of the D/A conversion circuit 37 are input to the selector 38, and the selector supplies Vrefw to the A/D conversion circuit 34 as the maximum reference value in the case of reading the reference white plate rwp, and supplies Vrefd to the A/D conversion circuit 34 as the maximum reference value in the case of reading a document.

The CCD 107 includes optical black (OPB) pixels that are sensor elements that physically block light and valid pixels that are sensor elements that output a voltage in proportion to the amount of incident light. The data of the OPB pixels and the valid pixels are respectively output for every main scanning period.

The offset level detection circuit 39 is configured to input and store an output of the A/D conversion circuit 34 corresponding to the OPB pixel of the CCD 107 while an x opb signal is asserted. The offset level is an average value of plural input OPB pixels and is stored for each output series of the CCD 107. The offset level subtracting circuit 35 is configured to subtract the offset level stored in the offset level detection circuit 39 from the output value of the A/D conversion circuit 34 that is input therein. A white peak detection circuit 41 is configured to store a peak value of image data that are input while an x lgate signal representing a valid pixel interval upon document reading and an SMPL signal representing a read period upon reading the reference white plate rwp are asserted. The CPU 42 may acquire the latest offset level value and peak value by accessing the offset level detection circuit 39 and the white peak detection circuit 41.

A shading data storing circuit 40 is configured to sequentially perform processes such as averaging on values read from the reference white plate rwp with respect to each pixel and sequentially store the resulting data. A shading correction circuit 36 is configured to convert read image data into shading corrected image data using the correction data stored in the shading data storing circuit 40. The CPU 42 may read image data of a predetermined pixel (e.g., predetermined position along the main scanning direction x of the reference white plate rwp) after storing image data obtained from reading the reference white plate rwp in a line memory of the shading data storing circuit 40 that temporarily stores image data for performing inter-line averaging of the image data.

It is noted that a predetermined delay occurs in the output of the A/D conversion circuit 34 upon performing A/D conversion of the image signals. The x opb signal corresponds to an offset level data range indicating signal that is designed to be asserted for a predetermined period at the output timing of the A/D conversion outputs corresponding to read analog signals of the OPB pixels. It is noted that normally, noise may be reduced by using a latter portion of read analog signals of the OPB pixels, and thus, such arrangement is employed in the present embodiment. The x lgate signal is asserted in a valid pixel area upon document reading, and is used for indicating a read range upon white peak detection.

A WTGT signal is asserted at the read timing of the reference white plate rwp, and is used as a selector switching signal. A selector 38 is configured to select Vrefw when the WTGT signal is asserted, select Vrefd when the WTGT signal is negated, and supply the selected voltage to the A/D conversion circuit 34. An SMPL signal is asserted during a portion of the time during which the CCD 107 reads the reference white plate rwp (WTGT assertion period), and is used to indicate the input timing for inputting reference white plate data to a shading data FIFO.

(Gain Control AGC)

In performing gain control AGC, the CPU 42 reads an operations program from a ROM 43a, writes the program in the RAM 43b, and executes operations according to this program. Specifically, when the first carriage moves to the position of the reference white plate rwp, the CPU 42 supplies the upper reference voltage Vrefw to the A/D conversion circuit 34 and reads peak data Dwp of the reference white plate reading. Then, a determination is made as to whether the peak data Dwp falls within a predetermined range Dp±B. It is noted that Dp corresponds to an adjustment target value that is arranged such that the peak value of an analog image signal input to the A/D conversion circuit 34 may not exceed the upper reference voltage Vrefw (e.g., 80% of the upper reference voltage Vrefw in consideration of the margin). The target value Dp is set in order to realize good performance of the A/D conversion circuit 34 and obtain an accurate digital signal, for example. Also, it is noted that B corresponds to the adjustment tolerance.

In the case where the peak data Dwp is within the predetermined range Dp±B, a control voltage Vg, the lower reference voltage Vrefb, and the upper reference voltages Vrefw and Vrefd that are currently set are stored in the RAM 43b. In the case where the peak data Dwp does not fall within the predetermined range Dp±B, a setting value Svg of the D/A conversion circuit 37 (D/A input) used for outputting the control voltage Vg that determines the gain is calculated so that the peak data Dwp may fall within the predetermined range. Then, a determination is made as to whether the calculated Svg falls within a setting value range (SvgL-SvgH). For example, if the D/A conversion circuit 37 is an 8-bit D/A conversion circuit, the setting value range is 0-255. If the calculated setting value is within the setting value range, the calculated setting value is actually set to the D/A conversion circuit 37, and the peak data Dwp is reread. If the calculated setting value Svg does not fall within the setting value range for the D/A conversion circuit 37, the value SvgL or SvgH within the setting value range that is close to the calculated value is set to the D/A conversion circuit 37, and the peak data Dwp is reread after which the determination of the peak data Dwp as is described above is made.

In the case where the peak data Dwp does not fall within the predetermined range Dp±B, the CPU 42 calculates the upper reference voltage Vrefw of the A/D conversion circuit 34 upon reading the reference white plate rwp. Given that the relationship between the setting value (input data) of the D/A conversion circuit 37 and the reference voltage Vrefw is represented as:

$$Vrefw = f(Srefw)$$

and the inverse function of f(Srefw) is represented as:

$$Srefw = g(Vrefw)$$

the input data Srefw of the D/A conversion circuit 37 for the reference voltage Vrefw to be changed may be represented as:

$$Srefw = g(Dwp/Dp/(f(Stp) - f(Stb)) - f(Stb))$$

wherein Dp represents the estimated peak data after changing the setting value Srefw that is directed for the reference voltage Vrefw and is to be input to the D/A conversion circuit 37; Stp represents the setting value Srefw input to the D/A conversion circuit 37 at the time the peak value Dwp is obtained; and Stb represents the setting value Srefb of the D/A conversion circuit 37 that is directed for the reference voltage Vrefb.

Then, a determination is made as to whether the calculated setting value Srefw is within the setting value range (SrefwL-SrefwH) of the D/A conversion circuit 37. For example, if the D/A conversion circuit 37 is an 8-bit D/A conversion circuit, the setting value range is 0-255. If the calculated value is within the setting value range, the calculated value is actually set to the D/A conversion circuit 37 and the peak data Dwp are reread. If the calculated setting value Srefw does not fall within the setting value range of the D/A conversion circuit 37, this corresponds to an error and a value within the setting value range that is close to the calculated value is set as the setting value, and the process is ended. It is noted that such an error may not occur unless a physical problem such as pattern breakage is present.

When the reference voltage Vrefw for reference white plate reading is changed, the reference voltage Vrefd for document reading has to be changed as well. Otherwise, the size of the image data after performing shading correction may be changed. Given that the reference white plate reading reference voltages Vrefw before and after the change are denoted as Vrefwb and Vrefwa, respectively; the document reading reference voltages Vrefd before and after the change are denoted as Vrefdb and Vrefda, respectively; and the lower reference voltage is denoted as Vrefb, the document reading reference voltage Vrefd is changed so that the following formula may be satisfied:

$$(Vrefwb - Vrefb)/(Vrefwa - Vrefb) = (Vrefdb - Vrefb)/(Vrefda - Vrefb)$$

In other words, the document reading reference voltage Vrefd for the D/A conversion circuit 37 is changed to the value of Vrefda in the above formula.

Then, the CPU 42 sets a setting value directed for Vrefd so that Vrefda may be output as the document reading the reference voltage, and set a setting value directed for Vrefw so that Vrefwa may be output as the reference white plate reading the reference voltage. The reference voltages Vrefw and Vrefd obtained from the setting values, the control voltage Vg at the time, and setting values Srefw, Srefd, Svg, and Srefb of the lower reference voltage Vrefb are stored in the RAM 43b, and the gain control AGC process is ended. The setting values obtained from this gain control process are transmitted to the controller board 400, and the transmitted setting values along with the gain control execution time (to be subsequently referred to as the previous execution time) are registered (updated) in a setting data table directed for the AFE 111 which table is stored in the HDD 401 corresponding to a nonvolatile memory (see step 26 of FIG. 13).

Immediately after the power of the scanner 100 (and the ADF 120) is turned on, the CPU 42 of the AFE 111 of the scanner 100 acquires the registered setting values from the controller board 400 (HDD 401), and writes the acquired setting values in the RAM 43b. Then, the CPU 42 sets the setting values in the image output correction units 113-118 shown in FIG. 6 (see steps 24 and 27 of FIG. 13).

(Gain Setting)

Upon arising from power-off mode or power saving mode to standby mode, the CPU 42 reads setting values relating to gain control that are registered in the setting data table of the HDD 401 of the controller board 400, writes the setting values in the RAM 43*b*, and then stores (sets) the setting values in the latches (registers) of the D/A conversion circuits 37 of the image output correction units 113-118. Specifically, the CPU 42 supplies the setting value Srefd for the reference voltage Vrefd registered in the HDD 401 corresponding to a nonvolatile memory to the D/A conversion circuit 37, and supplies the D/A conversion output voltage Vrefd as the upper reference voltage to the A/D conversion circuit 34 via the selector 38. Also, the setting values Svg and Srefb for the voltages Vg and Vrefb are supplied to the D/A conversion circuit 37. It is noted that when image signals are input to the image output correction unit 113, for example, after such setting operations are performed, the A/D conversion circuit 34 converts the read analog image signals of a document into image data, the A/D conversion involving dividing the input signals between the lower reference voltage Vrefb and the upper reference voltage Vrefd by a predetermined division number.

(Shading Correction Data Setting)

Upon setting shading correction data when the first carriage is positioned right below the reference white plate rwp, the CPU 42 reads the reference white plate rwp through the image reading process involving setting the setting values for gain control to the D/A conversion circuit 37 as is described above, generates shading correction data for one main scanning line based on the image data, and stored the generated shading correction data in the shading data storing circuit 40.

(Document Size Detection)

When the first carriage is positioned at the document size detecting position, and the on/off signal of the cover switch 112 indicates that the state of the cover 137 has changed from on open state to a closed state, the CPU of the read unit 110 (see FIG. 5) activates the lamp 102 and drives the first carriage to the home position HP, and the CPU 42 of the AFE 111 directs a document size detection unit 48 to perform document size detection. The document size detection unit 48 is configured to count the number of successive white pixels from a start point (e.g., rear side edge portion of the contact glass 101 in FIG. 3) to an end point for reading in the main scanning direction x, encode an average value of the count values of several lines into document size code, and output the document size code to the CPU 42. It is noted that in a case where a predetermined number of successive white pixels cannot be detected, the document size detection unit 48 may output a no-document code to the CPU 42.

(Image Output Correction)

In document image reading, the image output correction units 113-118 of the AFE 111 are arranged to execute image processes according to the setting values that are read from the setting data table of the HDD 401 corresponding to a nonvolatile memory and set to their respective D/A conversion circuits 37. For example, in the image output correction unit 113, the gain amplifier 32 amplifies image signals using the gain setting voltage Vg, and the A/D conversion circuit 34 converts the image signals into image data, the A/D conversion involving dividing the image signals between the lower reference voltage Vrefb and an upper reference voltage Vrefd by a predetermined division number. In the present embodiment, the upper reference voltages Vrefw and Vrefd that are set in the gain control process as is described above and written in a nonvolatile memory 43 (ROM 43*a*, RAM 43*b*) are used to convert analog image signals into image data, and thereby, even when the amount of light fluctuates from time to time, the image data output by the A/D conversion circuit 34 may be accurate and stable.

Then, the shading correction circuit 36 performs shading correction on the image data based on data stored in the shading data storing circuit 40. In this way, image data of image points along the main scanning direction x are corrected to image data having substantially the same value with respect to the same white level.

Then, a line combining unit 45 combines image data of an even numbered R pixel array on which shading correction is performed by the image output correction unit 113 in the manner described above are combined with image data of an odd numbered R pixel array on which shading correction is performed by the image output correction unit 114 in a similar manner to generate single-line data to be output to the scanner image processing unit 303. It is noted that single-line G image data and B image data are generated by line combining units 46 and 47, respectively, in a similar manner to be output to the scanner image processing unit 303.

In the following, shading correction that is performed in the case of flat-bed reading is described. When a user places a document on the contact glass 101 and closes the ADF 120, the cover switch 112 is switched from an on-state (open) to an off-state (closed). At this point, the first carriage is positioned at the document size detecting position, and the read unit 110 turns on the lamp 102 and starts driving the first carriage back to the home position HP (return drive operation). The document size detection unit 48 of the AFE 111 detects the document size of the document placed on the contact glass 101 based on the G image data output by the image output correction unit 115. When the reference point sensor 109 detects the first carriage, the read unit 110 updates sub scanning position data to data representing the sub scanning position of the reference point sensor 109 (fixed value data). During the time the first carriage is driven in the sub scanning direction, the read unit 110 increments the sub scanning position data in sync with the drive pulse of the pulse motor driving the first carriage (up-counts the drive pulse) while the first carriage is driven in the sub scanning direction (forward direction; from right to left in FIG. 2), and decrements the sub scanning position data (down-counts the drive pulse) while the first carriage is driven in a returning direction (right to left in FIG. 2). The read unit 110 positions the first carriage to the home position HP through monitoring the sub scanning position of the first carriage as is described above, and turns off the lamp 102 thereafter.

When a user operates a start key 17, the read unit 110 turns on the lamp 102 and starts driving the first carriage in the sub scanning direction for flat-bed reading. When the sub scanning position reaches the area of the reference white plate rwp, the shading data storing circuit 40 (see FIG. 6) starts reading the read image data of the reference white plate rwp, and calculates an average value for plural lines, then calculates a multiplying coefficient value for correcting the average value of image data directed for each pixel of a line image to image data representing the reference white level (e.g., 255 of a value equally approximately 80% thereof), and stores the calculated value in a FIFO memory of the data storing circuit 40.

While the sub scanning position is within the document start position to the document end position, the data storing circuit 40 sequentially reads multiplying coefficient values directed for the pixels of a line image from the FIFO memory, and supplies the read valued to the shading correction circuit 36. The shading correction circuit 36 supplies image data of the pixels of read lines of the document together with the multiplying coefficient values directed for the pixels to a read address of a ROM included in the shading correction circuit 36. It is noted that the ROM of the shading correction circuit 36 stores post shading correction image data (shading corrected image data) representing the product of the multiplying coefficient value and the image data supplied as an address information, and accordingly, the shading corrected image data corresponding to the image data supplied as an address are output from the ROM to be input to the following line combining unit 45.

In the following, shading correction for sheet-through reading is described. When a user places a document in the document tray 121 and operates the start key 17, the read unit 110 starts the paper feeding operation for transferring the document from the document tray 121, turns on the lamp 102 at the same time to start driving the first carriage in the sub scanning direction. When the sub scanning position of the first carriage reaches the area of the reference white plate rwp, the shading data storing circuit 40 (see FIG. 6) starts reading the read image data of the reference white plate rwp, calculates the average value of plural lines, then calculates multiplying coefficient values for correcting the average values of image data directed for the respective pixels of a line to image data of the reference white level, and stores the calculated coefficient values in the FIFO memory of the data storing circuit 40. After completing the above operations, the read unit 110 starts driving the first carriage in the returning direction to position the first carriage back to the home position HP. It is noted that such operations process is completed before the front edge of the document that is transferred from the document tray 121 reaches the window 132.

During document reading, from the time the front edge of the document enters the image capturing range of the first carriage positioned at the home position HP to the time the rear edge of the document exits the image capturing range of the first carriage, the data storing circuit 40 sequentially reads from the FIFO memory the multiplying coefficients directed for the respective pixels of a line and supplies the read values to the shading correction circuit 36. In turn, the shading correction circuit 36 outputs shading corrected image data to its associated line combining unit (line combining unit 45 in the example of FIG. 6).

When the rear edge of the document exits the image capturing range of the first carriage and if a next document is in the document tray 121, the read unit 110 starts transferring the next document from the document tray 121 and starts the reference white plate reading operations as is described above. Then, reading control operations are performed in a manner similar to the document reading control operations for the first document as is described above.

Figure 7:
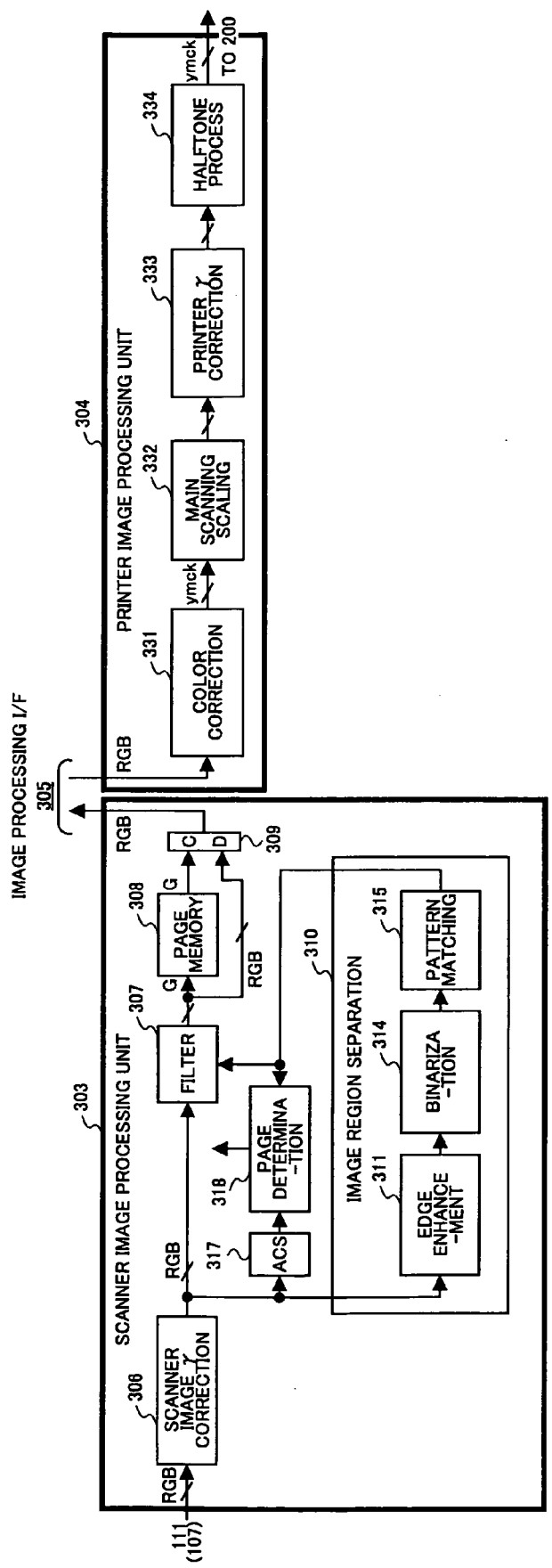
FIG. 7 is a block diagram showing configurations of a scanner image processing unit and a printer image processing unit of the image processing system of FIG. 5.

FIG. 7 is a block diagram illustrating the functions of the scanner processing unit 303 and the printer image processing unit 304 of FIG. 5. As is shown in this drawing, scanner γ correction 306 is performed on the RGB image data output by the AFE 111 of the color document scanner 100, and a filter process 307 is performed on the γ corrected RGB image data which filter process 307 involves performing an edge enhancement process on edge regions of the image and a smoothing process on halftone regions with gradation change based on image region detection results of an image region separation process 310.

It is noted that when black/white scanning or black/white copying is designated, in which case a 'BLACK (BK)' button (see FIG. 8) is operated (designated), the filter processed G image data obtained by performing the edge enhancement process or the smoothing process on the γ corrected G image data in the filter process 307 are written in a page memory 308. When a 'FULL COLOR' button (see FIG. 8) is operated, filter processed RGB image data obtained by performing the edge enhancement process or the smoothing process on the γ corrected RGB image data in the filter process 307 are stored in the memory 406 (see FIG. 5). When an 'AUTOMATIC COLOR SELECTION' button is operated or when none of the buttons 'BLACK (BK)', 'FULL COLOR', 'AUTOMATIC COLOR SELECTION', 'BLUE (C)', 'RED (M)', and 'YELLOW (Y)' is operated so that the color in which a document is to be read (scanned) or printed cannot be determined, the filter processed RGB image data obtained by the filter process 307 are stored in the memory 406 and the G image data are written in the page memory 308 at the same time.

A data selector 309 is configured to select and output one of the filter processed G image data stored in the page memory 308 and the filter processed RGB image data stored in the memory 406 as read image data. It is noted that the image data output to the image processing I/F 305 from the page memory 308 of the scanner image processing unit 303 are handled as Bk image data for black/white image reading hereinafter.

The image region separation process involves executing an edge enhancement process on γ corrected G image data obtained from the scanner γ correction process that corrects reading deviations. The edge enhancement process 311 involves sequentially identifying pixels each having image data of a G image data array directed thereto as target pixels; converting each target pixel into a total sum of the products obtained by multiplying a relevant set of image data corresponding to a 3×3 pixel matrix centered around the target pixel, for example, by edge enhancement coefficients directed to the respective pixels of the pixel matrix; and defining the converted value as an edge detection value for the target pixel. It is noted that the edge detection value represents the brightness of the edge in the present embodiment.

The edge detection value is converted into binary data indicating whether the corresponding image region may be an image edge candidate (e.g., H: image edge candidate; L: non-edge) by a binarization process 314, and a determination is made as to whether the target pixel corresponds to an edge position (edge pixel) by a pattern matching process 315. Specifically, a determination is made as to whether the target pixel region corresponds to a binary image such as text or line image, or halftone image such as a photographic image. The pattern matching process 315 determines that a target pixel corresponds to a pixel of an image edge region (text region) when the distribution of the binary data (edge candidate/non-edge) output by the binarization process 314 with respect to a region centered around the target pixel (e.g., 3×3 pixel matrix) matches a predetermined edge pattern.

The determination result (image edge/non-edge; i.e., text/photograph) of the pattern matching process 315 is supplied to the filter process 307, and the filter process 307 performs the edge enhancement process on a region that is determined as an image edge, and performs the smoothing process on a region that is determined as a non-edge region from the determination result with respect to the γ corrected image data.

Also, an ACS (Auto Color Select) 315 determines whether read image data represents a black/white (monochrome) image or a color image. A monochrome/color detection signal of the ACS 317 and the determination result (edge/non-edge; text/photograph) of the image separation 310 are supplied to a page determination 318. The page determination involves obtaining the number of pixels (image data signals) detected as color of the monochrome/color signals and the number of pixels determined as image edge of the image edge/non-edge determination signals, and upon completing document reading of one page, determining whether each of the obtained values is equal to or greater than a predetermined value, determining that the document image corresponds to a color image when the number of pixels detected as color is equal to or greater than the predetermined value, determining that the document image corresponds to a black/white image when the number of pixels detected as color is less than the predetermined value, determining that the document corresponds to a binary image (simply referred to as text hereinafter) including text and line images, for example, when the number of pixels detected as an image edge pixels is equal to or greater than the predetermined number, and determining that the document image corresponds to a non-edge image (simply referred to as photograph hereinafter) when the number of pixels detected as an image edge is less than the predetermined value. When the determination process of the page determination (monochrome/color and text/photograph) is completed for one page of document reading, the CPU 301 refers to the determination result thereof.

The printer image processing unit 304 performs color correction 331 involving converting RGB image data into ymc (recording color) image data and outputting the resulting ymc image data to main scanning scaling 332. The main scanning scaling 332 involves adjusting the scaling of image data as is necessary or desired. Then, printer γ correction 333 is performed according to the imaging characteristics of the printer 200, and a halftone process 334 is performed involving converting the γ corrected image data into image data representing the halftone according to a matrix distribution recorded/non-recorded pixels and outputting the resulting halftone image data to the printer 200. It is noted that in a case where the input image data include only G (Bk) image data, the input image data are supplied to the main scanning scaling 332 rather than the color correction 331. That is, a color correction process is not performed in a case where black/white image data are input to the printer image processing unit 304.

Figure 8:
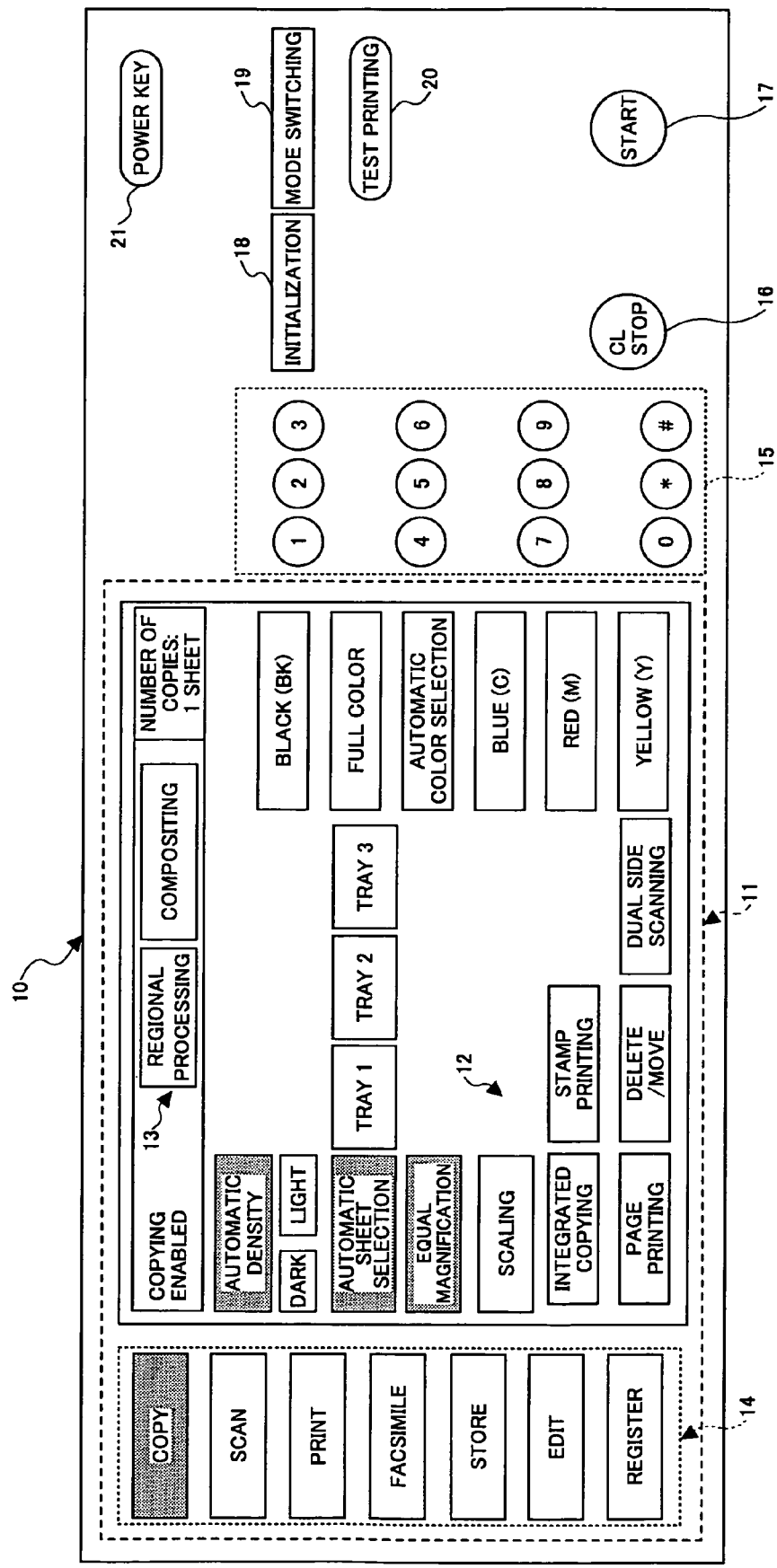
FIG. 8 is a plan view of a portion of an operations board of the multifunction copying machine of FIG. 1.

FIG. 8 is a diagram illustrating a configuration of the operations board 10. In the illustrated example, the operations board 10 includes a liquid crystal touch panel 11, ten keys 15, a clear/stop key 16, a start key 17, an initialization key 18, a mode switching key 19, a test printing key 20, and a power key 21. Also, it is noted that the liquid crystal panel 11 may include an alphabet keyboard with Japanese kana character inputting functions for inputting URLs, mail text, file names, folder names, setting information, and registering shortcut operations, for example.

The power key 21 is an operations key for directing switching from power saving mode (sleep mode or low-power mode) to standby mode (mode at which image printing may be immediately performed) and vice versa. When the power key 21 is pushed once while the power saving mode is set, the operations mode is switched from the power saving mode to the standby mode. When the power key 21 is pushed once while the standby mode is set, the operations mode is switched from the standby mode to the power saving mode. The test key 20 is configured to print one set of print image data regardless of a designated number prints to be output in order to check the print result.

By pushing the initialization key 18, the initialized state of the multifunction copying machine MF1 may be arbitrarily customized. For example, power saving mode switching waiting time (Td1, Td2), image output correction control execution time interval (Td3), the size(s) of paper accommodated in the machine, a state to which the machine is to be reset upon operating a copy function reset key may be arbitrarily set. When the initialization key 18 is operated, selection buttons for selecting one of functions for setting various types of default values including a 'default value setting' function, an 'ID setting' function, a 'copyright registering/setting' function, and 'usage hysteresis outputting' function, for example, are displayed.

The 'default value setting' function includes setting the switching waiting time Td1 for switching from standby mode to low-power mode, the switching waiting time Td2 for switching from low-power mode to standby mode, and the output correction control execution time interval Td3 for updating conversion parameters for converting analog image signals into digital image data, for example.

The liquid crystal touch panel 11 is configured to display messages indicating operation states of various function keys, the engine 300 and the controller board 400, for example. Also, the liquid crystal touch panel 11 is configured to display function selecting keys 14 for selecting and representing the operation states of functions including a 'COPY' function, a 'SCAN' function, a 'PRINT' function, a 'FACSIMILE' function, a 'STORE' function, an 'EDIT' function, and a 'REGISTER' function, for example. It is noted that a predetermined input/output screen is displayed according to the selection of a function selection key 14. For example, if the 'COPY' function is selected, a screen including messages 12 and 13 indicating relevant function keys, the number of copies to be printed, and the operation state of the machine, for example, as is shown in FIG. 8 are displayed. When an operator touches (operates on) a key displayed on the liquid crystal touch panel 11, the operations board 10 detects the key operation as an operator input, and inverts the display state of the selected key (indicated in grey in FIG. 8). Also, in a case where detailed conditions of a function (e.g., type of page printing) have to be designated, a detailed setting screen is displayed through popup display in response to the touching of the relevant function selection key. In the illustrated example, the liquid crystal touch panel 11 uses a dot display, and thereby, it may graphically display an appropriate screen according to the occasion.

Figure 9:
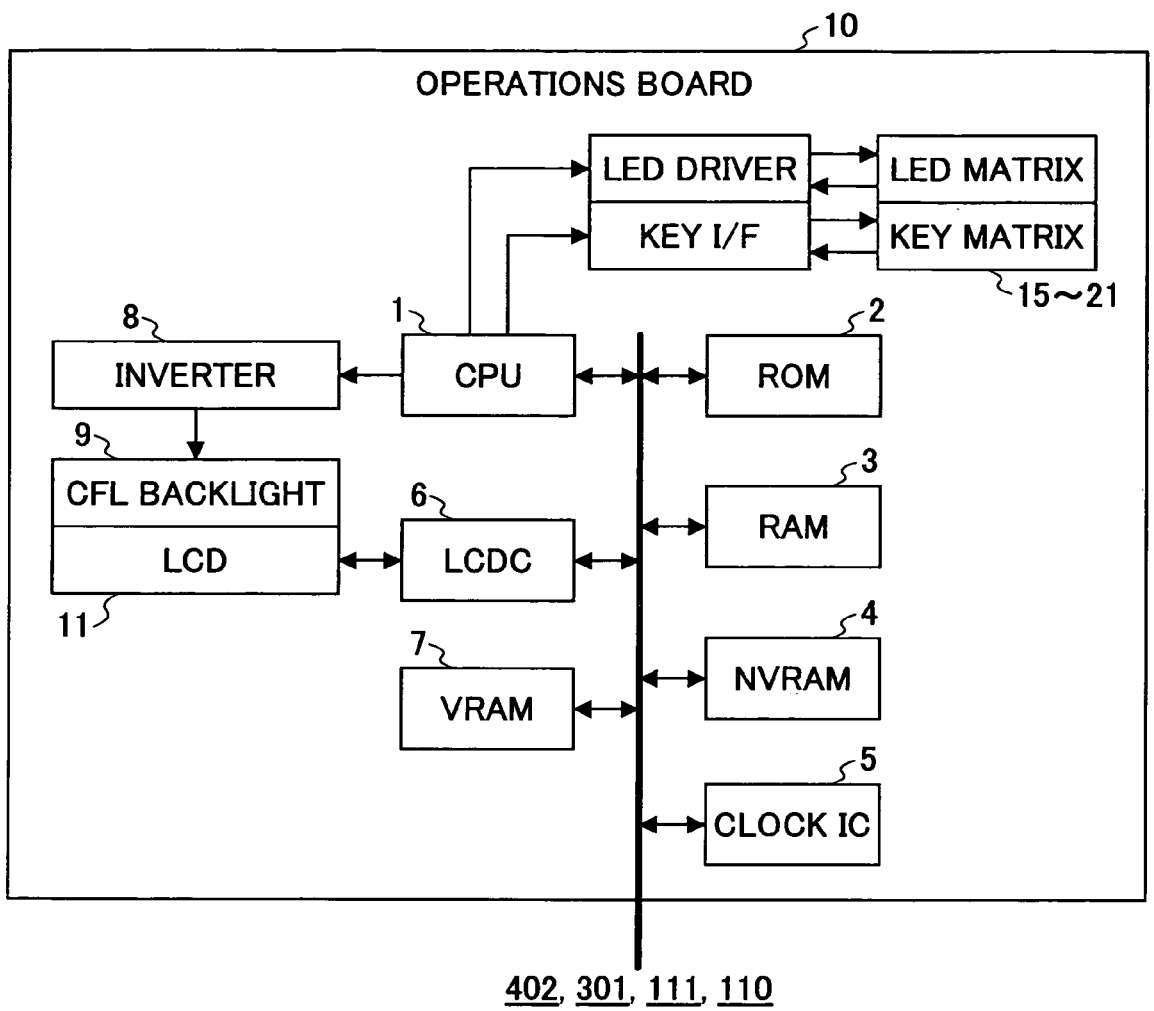
FIG. 9 is a diagram showing a circuit configuration of the operations board of FIG. 8.

The functions keys 12 include print color designating keys 'BLACK (BK)', 'FULL COLOR', 'AUTOMATIC COLOR SELECTION', 'BLUE (C)', 'RED (M)', and 'YELLOW (Y)', for example FIG. 9 is a diagram illustrating a circuit configuration of the operations board 10. In the illustrated example, the operations board 10 includes a CPU 1 as a primary component of an electric control system of the operations board 10, which CPU 1 is configured to communicate with the CPU 402 of the controller board 400, read an input of the operations board 10, and control the display of the operations board 10. The operations board 10 also includes a ROM 2 that stores control programs for the CPU 1, a RAM 3 for temporarily storing data upon performing control operations, for example, a VRAM 7 for storing depiction data for the liquid crystal touch panel 11, a liquid crystal display controller (LCDC) 6 that is connected to the VRAM 7 and is configured for controlling the depiction timing of the liquid crystal touch panel 11 and the touch input detection, for example, and a clock IC 5 for generating time data. The LCDC 6 is connected to the liquid crystal touch panel 11 that includes a CFL backlight 9 as a light source. The CPU 1 is also connected to an inverter 8 that drives the CFL backlight 9, a key matrix for the operation keys 15-21, a LED matrix for a display LED, and an LED driver for driving the LEDs. The CPU 1 is further connected to a data bus, which in turn is connected to a nonvolatile RAM (NVRAM) 4 for image processing mode storing.

The CPU 1 of the operations board 10 controls operations detection and display output performed by the copying machine in response to user operations such as detecting the operation (touch) of one or more numeric keys and generating input number data, detecting the operation of the start key and forwarding a start command to the controller board 400, detecting a paper size switching input, for example.

Figure 10:
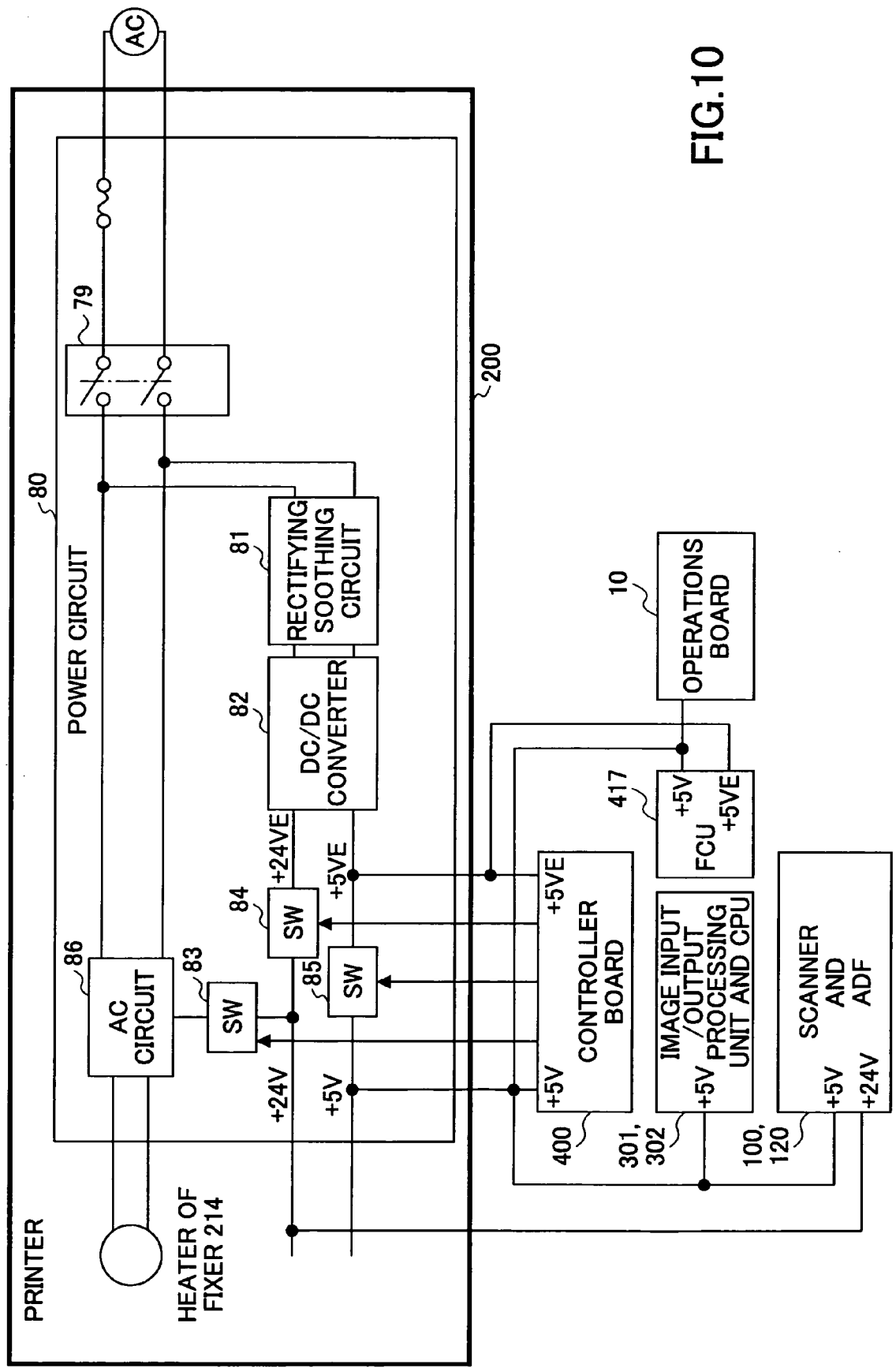
FIG. 10 is a block diagram showing a configuration of a power circuit of the multifunction copying machine of FIG. 1.

FIG. 10 is a diagram illustrating a circuit configuration of a power supply system that supplies an operating voltage to the respective components of the copying machine MF1 illustrated in FIGS. 1-5. In the illustrated example, when the main switch 79 is closed, a commercial alternating current of 100 V is supplied to a rectifying smoothing circuit 81 and an AC circuit 86 of a power circuit 80. A direct current output of the rectifying smoothing circuit 81 is applied to a DC/DC converter 82. In the present example, the DC/DC converter 82 is configured to generate two levels of direct current voltages +24 VE and +5 VE at stabilized voltages of +24 and +5 V, respectively, in response to user operations.

In the power circuit 80, the converter power outputs of +24 VE (with voltage +24 V) and +5 VE (with voltage +5 V) are connected to switches 84 and 85, respectively. The AC circuit 86 that powers a heater 87 of the fixer 214 includes a power relay that is closed upon having the +24 V voltage supplied thereto via a switch 83. When the power relay is closed, the commercial alternating current AC is applied to an alternating current powering circuit that powers the fixing heater 87 of the AC circuit 86. In the present example, the alternating current powering circuit includes a triac (phase control switching element) and is configured to refer to a temperature detection signal of a fixing temperature sensor (not shown) to control the conduction phase of the triac so that the fixing temperature reaches a target temperature.

It is noted that control signals for on/off control of the switches 83, 84, and 85 are supplied from the controller board 400 to the switches 83, 84, and 85. When the copying machine MF1 is set to standby mode (normal operations mode), in which case a predetermined fixing operation temperature for a fixing process to be performed on transfer paper having a toner image transferred thereon is arranged to be the target temperature of the fixer 214 and the temperature of a fixing roller is maintained at this target temperature so that the copying machine MF1 may start imaging substantially without delay in response to a copy start or print command, the controller board 400 switches on the switches 83, 84, and 85 by the control signals.

When the copying machine MF1 is set to low-power mode, the controller board 400 supplies an on command voltage +24 V to the power relay of the AC circuit 86 that powers the heater 87 of the fixer 214. In low-power mode, the on-state of the switch 84 for supplying a power of +24 V to a power system in order to enable operations of the scanner and the ADF 120 that do not involve printing such as reading image data to be stored or registered in the HDD 401, reading image data for facsimile transmission, or reading image data for transmission to a PC, for example, and the on-state of the switch 85 for supplying a power of +5 V to a communications system and control system are maintained.

In sleep mode, the controller board 400 switches off the switch 84 supplying +24 V to the power system, and the switch 85 supplying +5 V to the communications system and the control system. In other words, in sleep mode, all the switches 83-85 are switched off.

However, in the present embodiment, even when the switches 83-85 are switched off in sleep mode, the respective detection signal lines of the cover switch 112, the filler sensor 130, and the power key switch 21 of the operations board 10 are applied a detection voltage +5 VE at the state change detection circuit ACD of the controller board 400. Also, the voltage +5 VE continues to be applied to an electric circuit that detects a print command from a PC and a facsimile reception detection circuit of the facsimile control unit FCU.

Table 1 as is shown below represents the on/off states of the switches 83-85 according to different modes. Table 2 indicates the information processes that may be performed in the respective modes. It is noted that in Table 2, the information process 'TRANSMIT/RECEIVE' refers to facsimile transmission/reception that does not involve printing, and the information process 'RETAIN DATA' refers to a process of retaining image data stored in the memory 406.

TABLE 1

|  |  | SWITCH STATE | | |
|---|---|---|---|---|
|  |  | SW 83 | SW 84 | SW 85 |
| MODE | STANDBY | ON | ON | ON |
|  | LOW-POWER | OFF | ON | ON |
|  | SLEEP | OFF | OFF | OFF |

TABLE 2

|  |  | ENABLED FUNCTION: ○ | | | | | |
|---|---|---|---|---|---|---|---|
|  |  | DETECT INPUT | SCAN | COPY | PRINT | TRANSMIT RECEIVE | RETAIN DATA |
| MODE | STANDBY | ○ | ○ | ○ | ○ | ○ | ○ |
|  | LOW-POWER | ○ | ○ |  |  | ○ | ○ |
|  | SLEEP | ○ |  |  |  | ○ | ○ |

Figure 11:
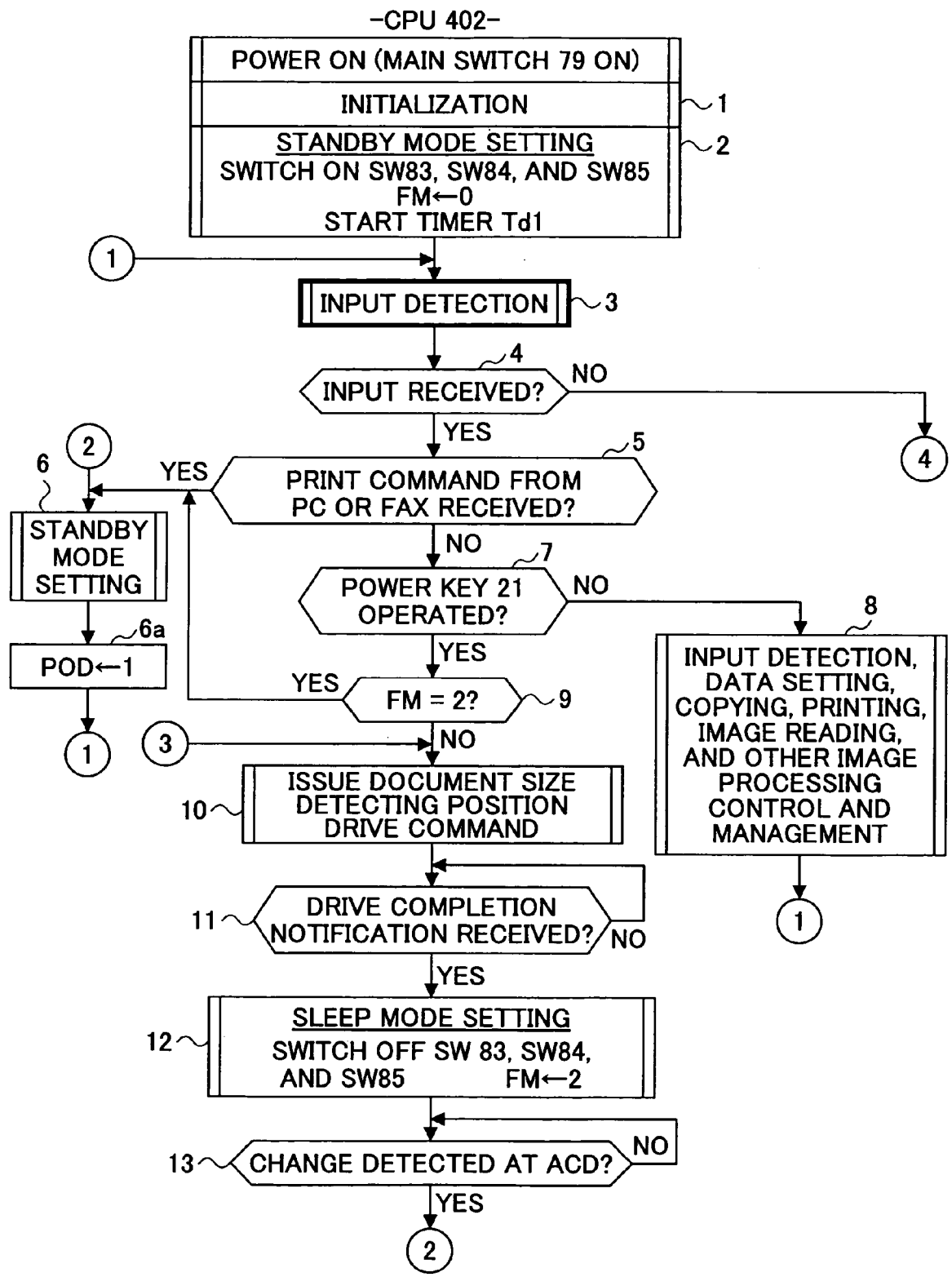
FIG. 11 is a flowchart illustrating one portion of a control process flow centered on power saving control that is executed by a CPU of a controller board of the image processing system of FIG. 5.
Figure 12:
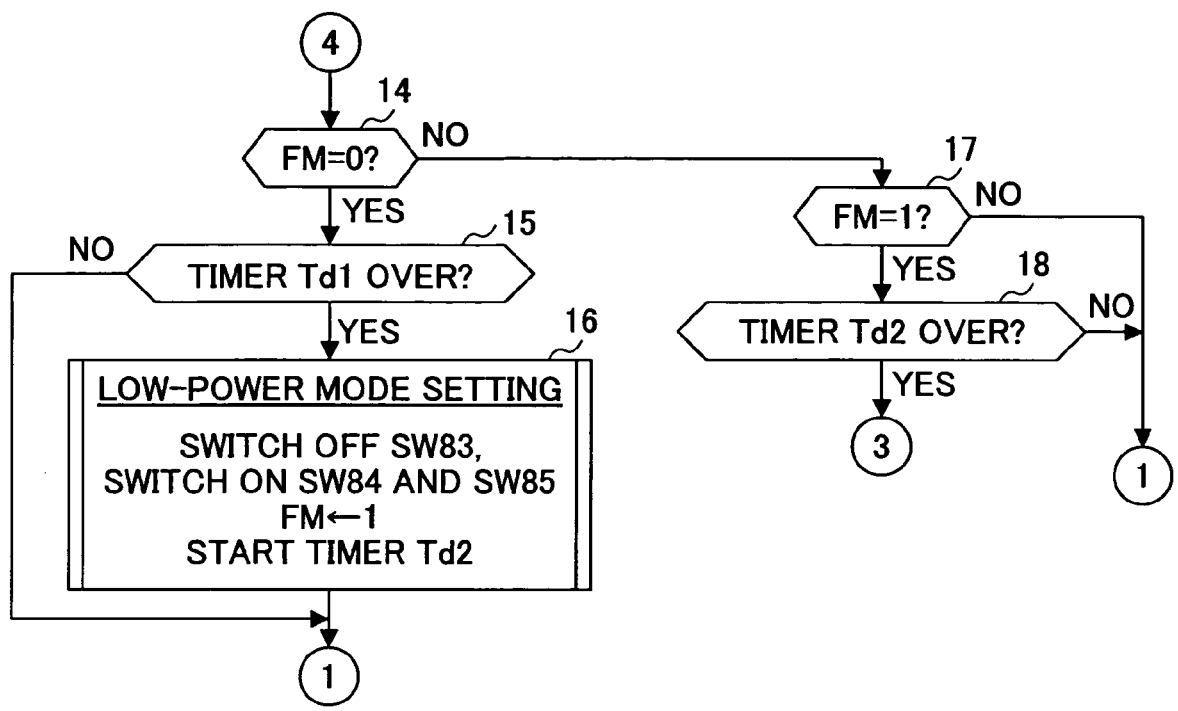
FIG. 12 is a flowchart illustrating the other portion of the control process flow executed by the CPU of the controller board.

FIGS. 11 and 12 are flowcharts illustrating control process steps for switching between standby mode, low-power mode, and sleep mode executed by the controller board 400 (CPU 402). First, referring to FIG. 11, when the main switch 79 between the power circuit 80 (see FIG. 10) and a commercial alternating current power source AC (outlet) is closed so that an operating voltage is supplied to the power circuit 80, the CPU 402 of the controller board 400 executes a power on response initialization process (step 1) and set the copying machine MF1 to standby mode (step 2). Specifically, the CPU 402 switches on the switches 83-85. Then, the CPU 402 sets data of the power saving mode register FM to '0' representing standby mode and starts a timer Td1 that has time limit Td1 as the waiting time limit before switching to low-power mode from standby mode.

When the standby mode is set, an operating voltage is supplied to the respective units of the multifunction copying machine MF1. For example, the CPU 1 of the operations board 10 executes a power-on initialization process in response to an operating voltage applied thereto by the setting of the standby mode in step 2. The power-on initialization process involves reading copying conditions for a normal process mode that are stored in the NVRAM 4 and displaying the read information on the liquid crystal touch panel 11. It is noted that operations of the document scanner 100 are described later in relation to flowcharts shown in FIGS. 13 and 14.

According to FIG. 11, in step 3, the CPU 1 of the operations board 10 detects user operations input via the operations board 10 and reports the detection result to the CPU 402 of the controller board 400. Also, the CPU 402 of the controller board 400 decodes a command from the PC or the FCU, for example. The CPU 1 of the operations board 10 controls operations detection and display output of the copying machine MF1 such as detecting an input of an image process mode key 14 and switching the display of the liquid crystal touch panel 11, detecting the operation of one or more numeric keys and generating input number data, detecting the operation of the start key and transmitting a start command to the controller board 400, detecting a paper size switching input in response to user operations made via the operations board 10.

According to the present embodiment, the waiting time Td1 before switching from standby mode to low-power mode, and the waiting time Td2 before switching from low-power mode to sleep mode may be set through input operations using the operations board 10. The input values are stored (registered) in the NVRAM 4 shown in FIG. 9. Specifically, when the operation (by the user/operator) of the initialization key 18 of the operation keys 15-21 is detected in the input detection step 3, the CPU 1 displays a menu screen on the liquid crystal touch panel 11. In this case, when the operator selects a time setting column of the menu screen, the CPU 1 displays a setting screen 12p on a portion of the display screen of the liquid crystal touch panel 11 as is shown in FIG. 15 for setting the power saving mode switching waiting time Td1, the sleep mode switching waiting time Td2, and the output correction control (gain control) execution time interval Td3.

Figure 15:
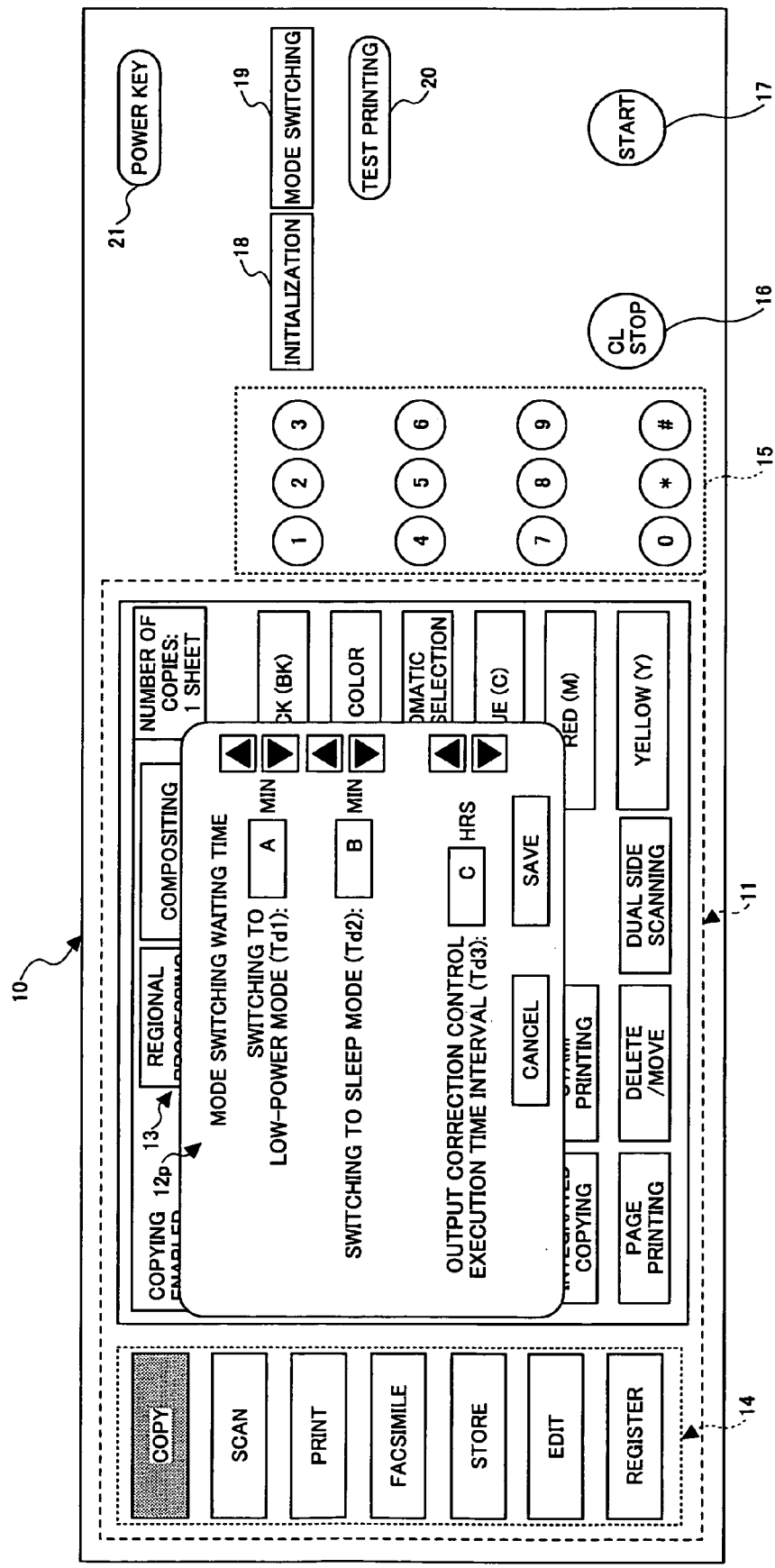
FIG. 15 is a diagram showing an exemplary display screen that may be displayed on a liquid crystal panel of the operations board of FIG. 5 upon designating time setting out of default value setting options.

Referring to FIG. 15, in the illustrated example, the operator may operate the up/down buttons displayed on the setting screen 12p to adjust the time limit (waiting time) A set to timer Td1 for switching from standby mode to low-power mode, the time limit (waiting time) B set to timer Td2 for switching from low-power mode to sleep mode, and the gain control execution time interval C set to timer Td3 for signaling the timing at which gain control AGC is to be executed. In the present example, when the operator touches the 'SET' button, the CPU 1 rewrites the time limits Td1 (A) and Td2 (B) indicated on the display at the time in the NVRAM 4, and transmits the time limits Td1 (A) and Td2 (B) to the CPU 402 of the controller board 400. The CPU 402 updates corresponding data stored in its internal RAM to the received time limit data Td1 (A) and Td2 (B). It is noted that the time limit data Td1 (A) and Td2 (B) are referred to in steps 2 and 10, respectively. The gain control execution time interval Td3 (C) is written in a data table directed to the AFE 111 of the HDD 401.

The time limits Td1 and Td2 written in the NVRAM 4 are read by the CPU 1 of the operations board 10 as copying conditions for a normal process mode and displayed on the liquid crystal touch panel 11 in the power on initialization in response to the setting of the standby mode (step 2). At this point, the read time limits Td1 and Td2 are forwarded to the CPU 402 of the controller board 400. The CPU 402 of the controller board 400 stores the time limit data Td1 and Td2 in its internal RAM, and sets the time limit data Td1 and Td2 as time limit values for the timers Td1 and Td2 in steps 2, 7, 9, and 11.

In the example of FIG. 11, upon receiving a print command from a PC in the input detection step 3, or upon being notified of a facsimile reception by the FCU 417 in step 5, if the power circuit 80 is set to sleep mode or low-power mode, the CPU 402 switches the power circuit 80 to standby mode in step 6, and sets the latch of the state change detection circuit ACD to output a power-on mode signal POD that is switched to high-level H ('1') in step 6a.

In the input detection step 3 of FIG. 11, when a command input such as the operation of the operations board 10 by a user (e.g., touching of the image process mode designation keys 14, numeric keys, start key, paper size switching key) is received, the CPU 402 of the controller board 400 proceeds to process steps for responding to such command inputs (i.e., steps 5, 7, and 8).

In the input detection step 3 of FIG. 11, when the power key 21 is operated while the power circuit 80 is set to standby mode (FM=0) or low-power mode (FM=1), the CPU 1 of the operations board 10 and the CPU 402 of the controller board 400 interpret such user operation as a command for switching the copying machine to sleep mode (see steps 7 and 9), directs the CPU of the read unit 110 to drive the first carriage to the document size detecting position (step 10), waits for the CPU of the read unit 110 to signal the completion of the drive operation for driving the first carriage to the document size detecting position (step 11), writes the image process mode currently displayed on the liquid crystal touch panel 11 as the previous mode in the NVRAM 4, and switches the copying machine MF1 to sleep mode (step 12). After switching to sleep mode, the CPU 402 waits for the state change detection circuit ACD to generate a change detection signal (step 13), and when a change detection signal is generated, the CPU 402 sets the power circuit 80 to standby mode (step 6). It is noted that when a print command is received from a PC while waiting for the generation of a change detection signal, the CPU 402 sets the power circuit 80 to standby mode in response to such a print command from the PC (step 6).

When the power key 21 is turned on (operated) by the user while the power circuit 80 is set to sleep mode (FM=2), the CPU 402 interprets such a user operation as a command for switching to standby mode, sets the power circuit 80 to standby mode, reads the previous image process mode written in the NVRAM 4, and displays the previous process mode on the liquid crystal touch panel 11 (steps 7, 9, and 6).

Referring to FIG. 12, when no command inputs are detected in the input detection step 3 of FIG. 11, the CPU 402 checks whether the timer Td1 has reached its time limit while waiting for a command to be input (see step 4 of FIG. 11 and step 14 and 15 of FIG. 12). When the timer Td1 reaches its time limit without receiving any command input, the CPU 402 of the controller board 400 switches the power circuit 80 to low-power mode (step 16 of FIG. 12). Specifically, the CPU 402 turns off the switch 83 while maintaining the switches 84 and 85 to on-states, rewrites the mode register FM to '1' indicating that the copying machine MF1 is in low-power mode, and starts the timer Td2 with time limit Td2. When the time limit Td2 of the timer Td2 is reached without receiving any input (steps 17 and 18), the CPU 402 executes processes for switching to the sleep mode (steps 10-12 of FIG. 11).

Figure 13:
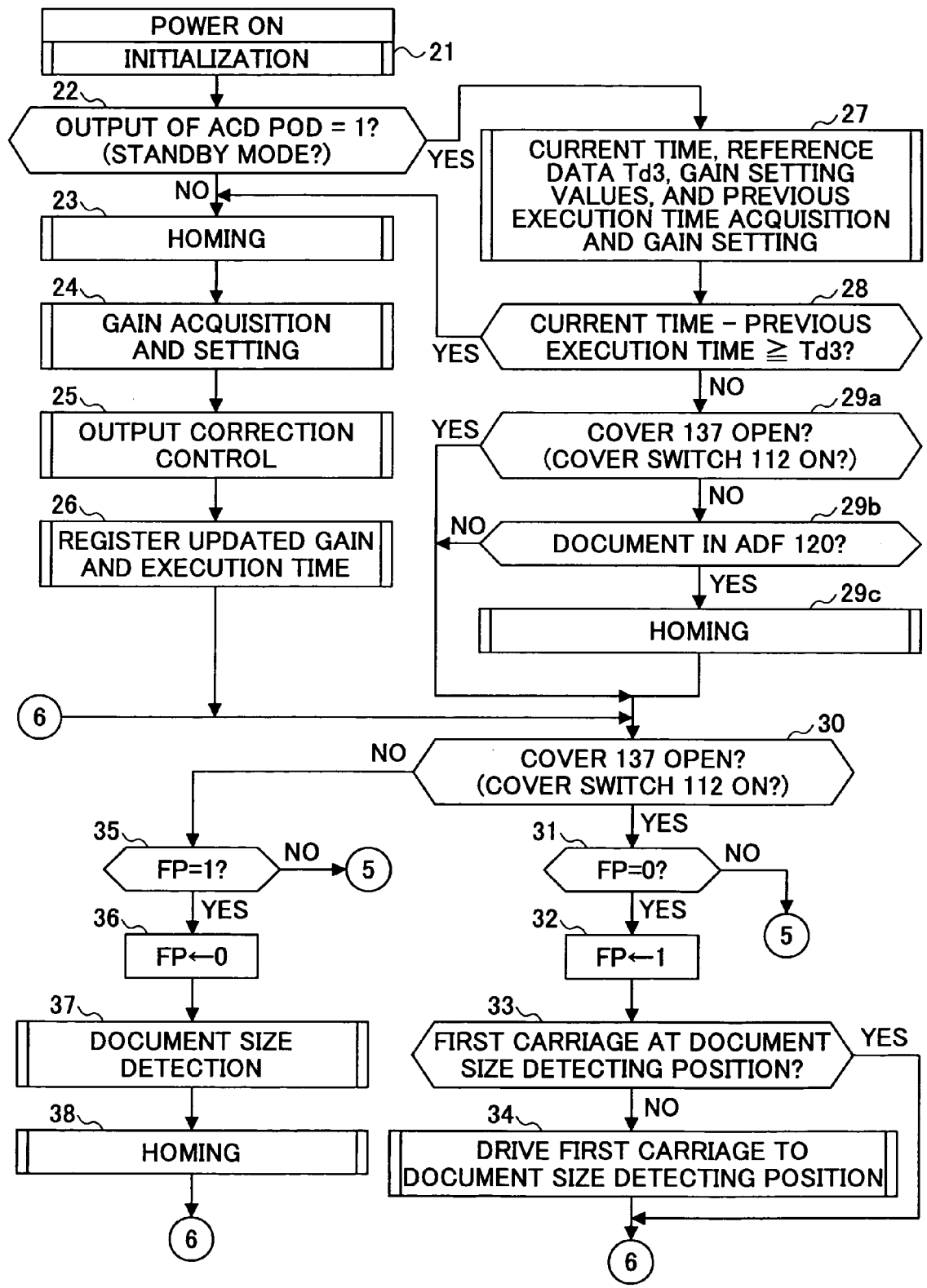
FIG. 13 is a flowchart illustrating one portion of a control process flow centered on controlling document size detection, homing, and image output correction executed by a read unit and the image signal processing circuit (AFE) of the image processing system of FIG. 5.
Figure 14:
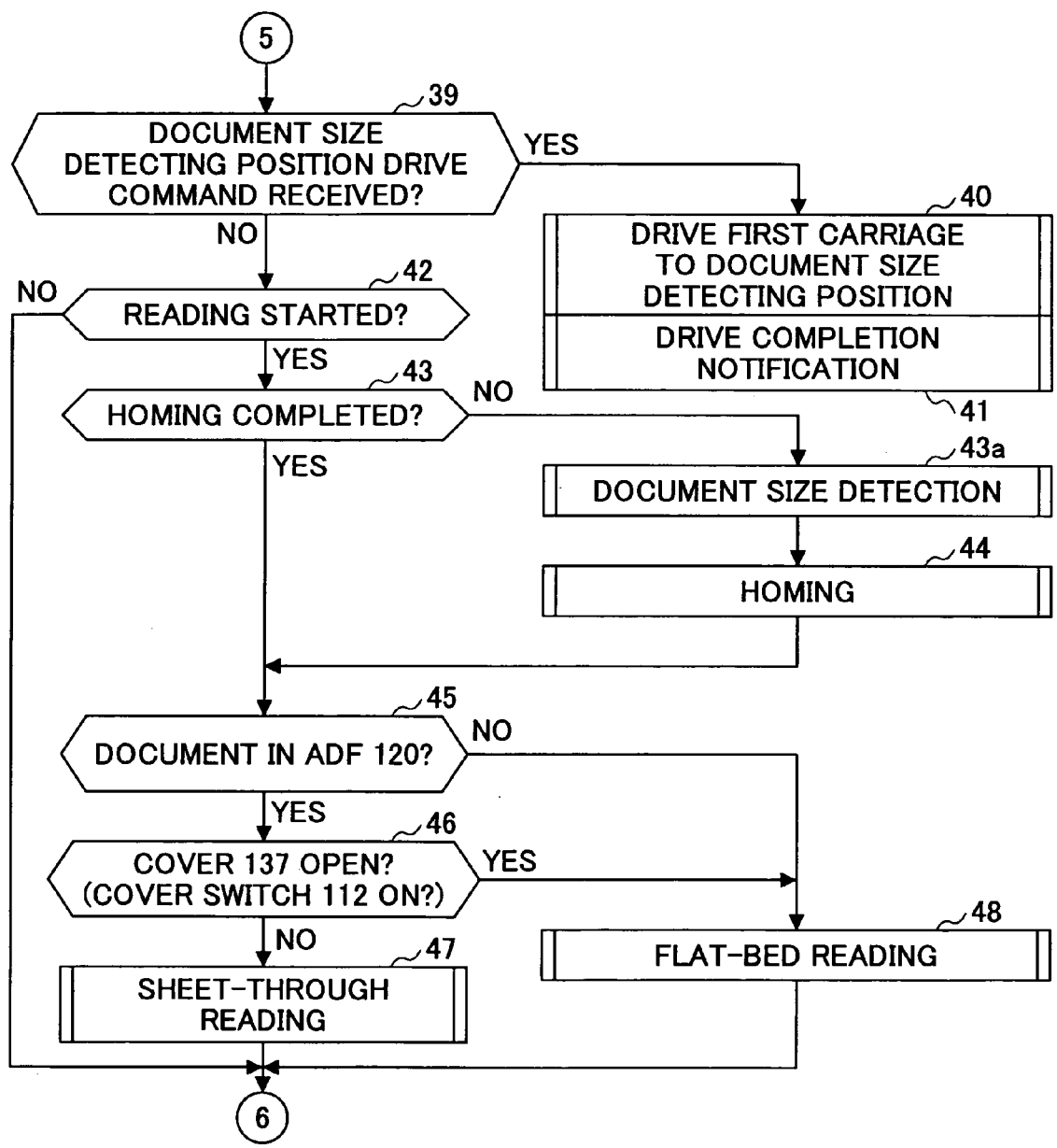
FIG. 14 is a flowchart illustrating the other portion of the control process flow executed by the read unit and the AFE.

FIGS. 13 and 14 are flowcharts illustrating control process steps for controlling document size detection, homing, and image output correction that are executed by the CPU 301 of the engine 300, the CPU of the read unit 110, and the CPU 42 of the AFE 111. When the power of the document scanner 100 and the ADF 120 is turned on, the CPU of the read unit 110 executes power on initialization in response to receiving the operating voltage +5 V (step 21). The read unit 110 (its CPU)

refers to the power-on mode signal POD of the state change detection circuit ACD (step 22).

If the power-on mode signal POD is '0' indicating that the application of the operating voltage to power circuit 80 is a result of the main switch 79 being switched from an off-state to an on-state, the CPU of the read unit 110 executes homing (step 23). In the homing step 23, the CPU of the read unit 110 drives the first carriage including the lamp 102 and the first mirror 103 in the returning direction (i.e., towards the left in FIG. 2), and when the reference point sensor 109 detects the first carriage, it registers reference point data representing the distance A (see FIG. 2) in the sub scanning position register that is assigned within the internal memory of the CPU of the read unit 110. Also, information '1' indicating that homing has been completed is written in a homing register. Then, the first carriage is driven further in the returning direction while counting down (decrementing) the reference point data in sync with the drive pulse of the carriage driving pulse motor and updating the position data registered in the sub scanning position register to the current position. When the position data in the sub scanning position register are updated to represent the home position HP corresponding to the sub scanning driving reference point for flat-bed document reading, the driving operation of the first carriage is stopped. It is noted that when the first carriage is driven in the returning direction and moves past the home position HP without being detected by the reference point sensor 109, a limit switch (not shown) arranged as the left side of the home position HP is switched off from an on-state by the first carriage. In such a case, the CPU of the read unit 110 stops the operation of the carriage driving pulse motor, and then starts driving the first carriage in the sub scanning direction (towards the right in FIG. 2). When the reference point sensor 109 detects the first carriage while it is driven in the sub scanning direction, it registers the reference point data representing the distance A (see FIG. 2) in the sub scanning position register. The first carriage is driven further in the sub scanning direction while counting up (incrementing) the reference position data in sync with the drive pulse of the carriage driving pulse motor and updating the position data of the sub scanning position register to data representing the current position. When the reference position data is updated to represent the document size detecting position (A+B+C), the driving of the first carriage in the sub scanning direction is stopped. Then, the first carriage is driven in the returning direction (left in FIG. 2), and when the reference point sensor 109 detects the first carriage, it registers the reference position data representing the distance A (FIG. 2) in the sub scanning position register. Then, information '1' indicating the completion of homing is registered in the homing register. Then, the first carriage is drive in the returning direction until the position data of the sub scanning position register are updated to represent the home position HP corresponding to the sub scanning driving reference point for flat-bed document reading at which point the driving operation of the first carriage is stopped.

After the homing step 23 is completed, the CPU of the read unit 110 performs a step of acquiring and setting the read gain (step 24).

In the step of acquiring and setting the read gain (step 24), the CPU 42 of the AFE 111 reads the various setting values for controlling the gain, for example, that are registered in the setting data table directed for the AFE 111 of the HDD 401 of the controller board 400, writes the read setting values in the RAM 43*b*, and stores the setting values in the respective latches of the D/A conversion circuits of the image output correction units 113-118. Specifically, the CPU 42 reads from the HDD 401 corresponding to a nonvolatile memory the setting value Srefd for acquiring the reference voltage Vrefd and supplies the read setting value Srefd to the D/A conversion circuit 37 to then supply the D/A conversion output voltage Vrefd to the A/D conversion circuit 34 via the selector 38 as the reference voltage. The setting values Svg and Srefb for acquiring the voltages Vg and Vrefb are supplied to the D/A conversion circuit 37 in a similar manner.

Then, the CPU 42 performs an output correction control step 25. Such a step corresponds to the gain control AGC as is described above. The setting values updated through gain control AGC are registered (updated) in the setting data table directed for the AFE 111 of the HDD 401 along with the current time which is subsequently referred to as the previous gain control (correction) execution time. Then, the first carriage is driven back to the home position HP in step 26.

In the power-on initialization step 21 performed in response to the application of the operating voltage +5 V to the read unit 110, when the power on mode signal POD is '1' indicating that the application of the operating voltage +5 V is a result of switching from sleep mode to standby mode, the CPU of the AFE 111 acquires the current time from the clock IC 5 of the operations board 10, acquires (reads) from the setting data table directed for the AFE 111 of the HDD 401 reference data Td3 (C), the setting values for acquiring the gain, and the previous correction execution time; writes the read data in the RAM 43*b*; and stores the data in the respective latches of the D/A conversion circuits of the image output correction units 113-118. Specifically, the setting value Srefd for acquiring the reference voltage Vrefd is supplied to the D/A conversion circuit 37, and the corresponding D/A conversion output voltage Vrefd is supplied to the A/D conversion circuit 34 via the selector 38 as the reference voltage. The setting values Svg and Srefb for acquiring the voltages Vg and Vrefb are supplied to the D/A conversion circuit 37 in a similar manner (step 27). Then, the CPU 42 refers to the previous correction execution time, the current time, and the reference data Td3, and determines whether the elapsed time from the previous correction execution time to the current time exceeds the reference data Td3. If the elapsed time exceeds the reference data Td3, the CPU 42 executes the homing step 23, the read gain acquisition and setting step 24, the output correction control step 25, and the updated read gain and execution time registration step 26 as is described above.

In a case where the elapsed time from the previous correction execution time to the current time is less than Td3, if the cover 137 is closed and a document is placed in the ADF 120, a sheet-through reading command is likely to be issued. Accordingly, homing is performed and the first carriage is positioned to the home position HP (step 29*c*). It is noted that the homing operation performed in step 29*c* may be substantially identical to that performed in step 23. On the other hand, if the cover 137 is opened and no document is placed on the ADF 120, since the first carriage is previously driven to the document size detecting position upon being switched to sleep mode and the cover 137 is likely to be closed thereafter (to require document size detection), the homing operation (step 29*c*) is not performed in this case; that is, the first carriage is not driven to the home position HP.

Then, in step 30 and onward, the CPU of the read unit 110 monitors the on/off signal of the cover switch 112 (steps 30-32, steps 30-35-36). When the open angle of the cover 137 with respect to the contact glass 101 exceeds a predetermined angle of approximately 30 degrees (i.e., when the cover 137 is lifted up and opened to an angle exceeding the predetermined angle), data of a cover open/close register FP is changed (updated) from '0' representing a cover closed state to '1' representing a cover opened state (steps 30-31-32). Then, when the first carriage is not positioned at the document size detecting position, the first carriage is driven to the document size detecting position (steps 33-34).

When the cover 137 is closed to form an angle with the contact glass 101 that is no greater than the predetermined angle of approximately 30 degrees, the CPU of the read unit 110 updates the data of the cover open/close register FP from '1' representing the cover open state to '0' representing the cover closed state (steps 30-35-36), and then performs document size detection (step 37).

In the document size detection step 37, the CPU of the read unit 110 activates the lamp 102, starts driving the first carriage to the home position HP (return direction driving; i.e., leftward direction in FIG. 2), directs the document size detection unit 48 to perform document size detection via the CPU 42 of the AFE 111. The document size detection unit 48 detects the document size of the document placed on the contact glass 101 based on the read image signal of the CCD 107 and outputs a corresponding document size code to the CPU 42. In turn, the CPU 42 informs the CPUs 301 and 402 and the operations board 10 of the obtained document size code.

Then, the CPU of the read unit 110 performs homing (step 38) in a manner identical to that performed in step 23.

For example, when a user places a document on the contact glass 101 and lowers the ADF 120 towards the contact glass 101, the size of the document placed on the contact glass 101 may be detected through the process step sequence 30-35-36-37-38 of FIG. 13, and the first carriage may be driven to the home position HP as the sub scanning driving start position. Then, when the user inputs a start command for starting a copying operation, flat-bed reading may be performed (steps 42-43-45-48 of FIG. 14).

When there is no change in the open/closed state of the cover 137, the CPU of the read unit 110 goes through the process step sequence 30-35-39 or 30-31-39 and waits for a document size detecting position drive command or a document reading start command to be supplied from the CPU 402 in step 39 or 42 of FIG. 14. As is described above, upon switching to sleep mode, the CPU 402 supplies the document size detecting position drive command for driving the first carriage to the document size detecting position to the read unit 110 (step 10 of FIG. 11). In turn, the read unit 110 drives the first carriage to the document size detecting position if the first carriage is not positioned thereat, reports the completion of the drive operation to the CPU 402 (step 41), and waits for the operation mode to be switched to the sleep mode (in which mode the operating voltage supplied to the scanner is blocked). When the CPU 402 receives the driving operation completion response from the read unit 110, it switches the power circuit 80 to sleep mode (steps 11 and 12 of FIG. 10).

When the CPU 301 directs the read unit 110 to start document reading, the CPU of the read unit 110 refers to the information of the homing register (step 43). If the information is '0' indicating that homing is not complete, document size detection is performed (step 43*a*). It is noted that the document size detection performed in step 43*a* is substantially identical to that performed in step 37 of FIG. 13. After document size detection is completed, the homing is performed in step 44. It is noted that the homing performed in step 44 is substantially identical to that performed in step 23 of FIG. 13. By performing homing in step 44, the information of the homing register may be set to '1' indicating that homing is completed.

After homing is completed, the CPU of the read unit 110 refers to the detection signal of the filler sensor 130 (step 45). If the detection signal of the filler sensor 130 indicates that a document is placed in the ADF 120, sheet-through document reading is performed (step 47). If the detection signal of the filler sensor 130 indicates that no document is placed in the ADF 120, flat-bed document reading is performed (step 48).

Figure 16:
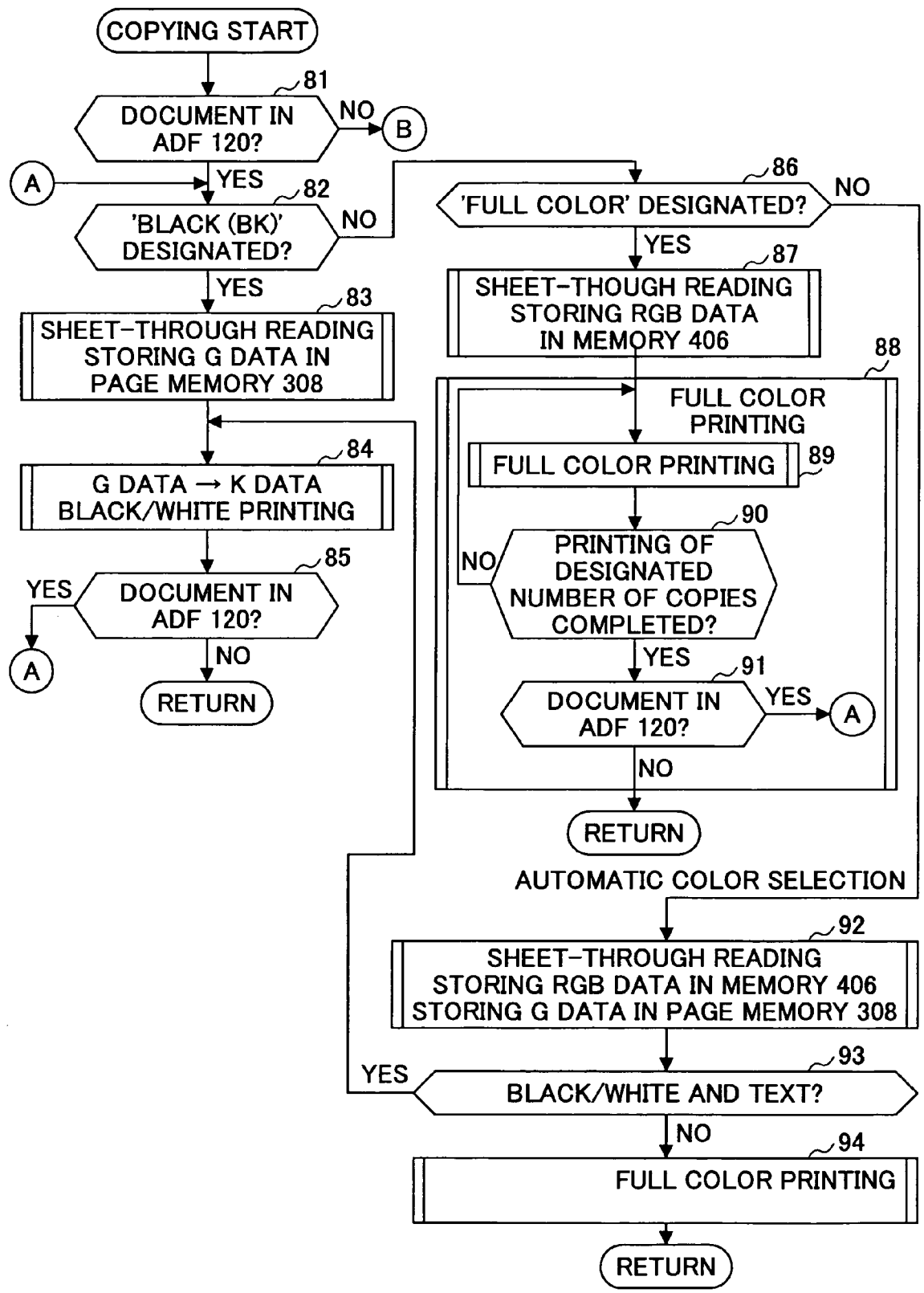
FIG. 16 is a flowchart illustrating one portion of a copying control process executed by a CPU of an engine of the multifunction copying machine of FIG. 1 in response to a copying command from the CPU of the controller board.
Figure 17:
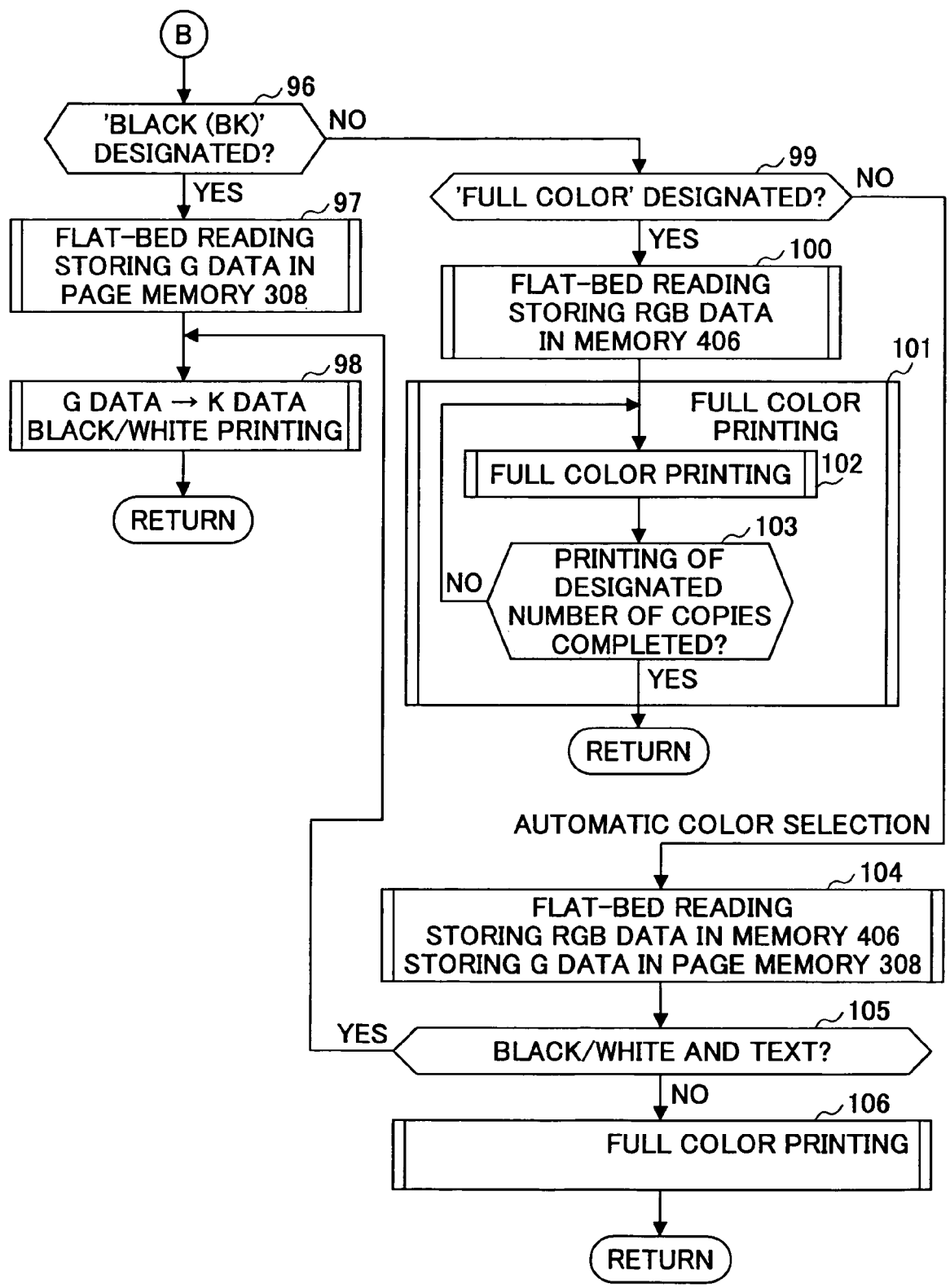
FIG. 17 is a flowchart illustrating the other portion of the copying control process executed by the CPU of the engine.

FIGS. 16 and 17 are flowcharts illustrating copying control processes executed by the CPU 301 of the engine 300 in response to receiving a copying command. As is shown in FIG. 16, if a document is placed in the ADF 120, the read unit 110 performs sheet-through document reading (step 83 or 87). In this case, if the 'BLACK (BK)' button (see FIG. 8) is switched on, the CPU 301 controls the scanner image processing unit 303 to store in the page memory 308 (see FIG. 7) G image data filter processed by the filter process 307 according to image region separation results (steps 81-83). When sheet-through reading of one document is completed, the CPU 301 reads the G image data stored in the page memory 308, executes processes of the printer image processing unit 304, executes a binarization process, outputs the resulting data to the write unit 212 of the printer 200, and executes black/white printing (Bk printing) to output a designated number of copies from the printer 200 (step 84).

If the 'FULL COLOR' button is switched on, the scanner image processing unit 303 stores RGB image data in its memory 406 (steps 86 and 87) to realize full color printing (step 88). In the full color printing step 88, the RGB image data are converted into ymck recording color data at the printer image processing unit 304, and the recording color data of the respective colors are output in parallel to the write unit 212 (see FIG. 5) in step 89. This process sequence is repeated for the designated number of copies to be printed (steps 89-90). It is noted that the full color copying operation as is described above is performed for each document that is placed in the document tray 121.

If the buttons 'BLACK (BK)', 'FULL COLOR', 'AUTOMATIC COLOR SELECTION', 'BLUE (C)', 'RED (M)', or 'YELLOW (Y)' are all switched off, or if the 'AUTOMATIC COLOR SELECTION' button is switched on, the CPU 301 directs the read unit 110 to perform sheet-through reading, and directs the scanner image processing unit 303 to store the G image data filter processed by the filter process 307 according to image region separation results in the page memory and store the RGB image data in the memory 406 at the same time (step 92). Then the CPU 301 refers to page determination information of the page determination 318 to determine whether the read image corresponds to back/white text (black/white and edge) image (step 93). If the read image represents a black/white text image, black/white printing is performed (steps 84 and 85) as in the case where the 'BLACK (BK)' button is switched on. If the page determination information indicates that the read image does not correspond to a black/white text image, then full color copying is performed (step 94). It is noted that the full color copying performed in step 94 may be substantially identical to that performed in step 88.

Referring to FIG. 17, when a copying start command is issued in a state where no document is placed in the ADF 120 and the 'BLACK (BK)' button is switched on, the CPU 301 directs the read unit 110 to perform flat-bed reading and executes black/white copying (steps 96-98). In a case where the 'FULL COLOR' button is switched on, the CPU 301 directs the read unit 301 to perform flat-bed reading, and stores RGB image data in the memory 406 (steps 99 and 100) to execute full color printing for outputting a designated number of copies (step 101). In the full color printing step 101, the RGB image data is converted into ymck recording color data at the printer image processing unit 304 and the recording color data in the respective colors are output in parallel to the write unit 212 (see FIG. 5) in step 102. It is noted that the full color printing step as is described above is repeated for printing the designated number of copies (steps 102 and 103).

If the buttons 'BLACK (BK)', 'FULL COLOR', 'AUTOMATIC COLOR SELECTION', 'BLUE (C)', 'RED (M)', or 'YELLOW (Y)' are all switched off, or if the 'AUTOMATIC COLOR SELECTION' button is switched on, the CPU 301 directs the read unit 110 to perform flat-bed reading, and directs the scanner image processing unit 303 to store in the page memory 308 the G image data filter processed by the filter process 307 according to the results of image region separation referring to the edge detection amount obtained from the edge enhancement process 311, and store the RGB image data in the memory 406 at the same time (step 104). Then the CPU 301 refers to page determination information of the page determination 318 to determine whether the read image corresponds to back/white text (black/white and edge) image (step 105). If the read image represents a black/white text image, black/white printing is performed (step 108) as in the case where the 'BLACK (BK)' button is switched on. If the page determination information indicates that the read image does not correspond to a black/white text image, then full color copying is performed (step 106). It is noted that the full color copying performed in step 106 may be substantially identical to that performed in step 101.

Second Embodiment

Figure 18:
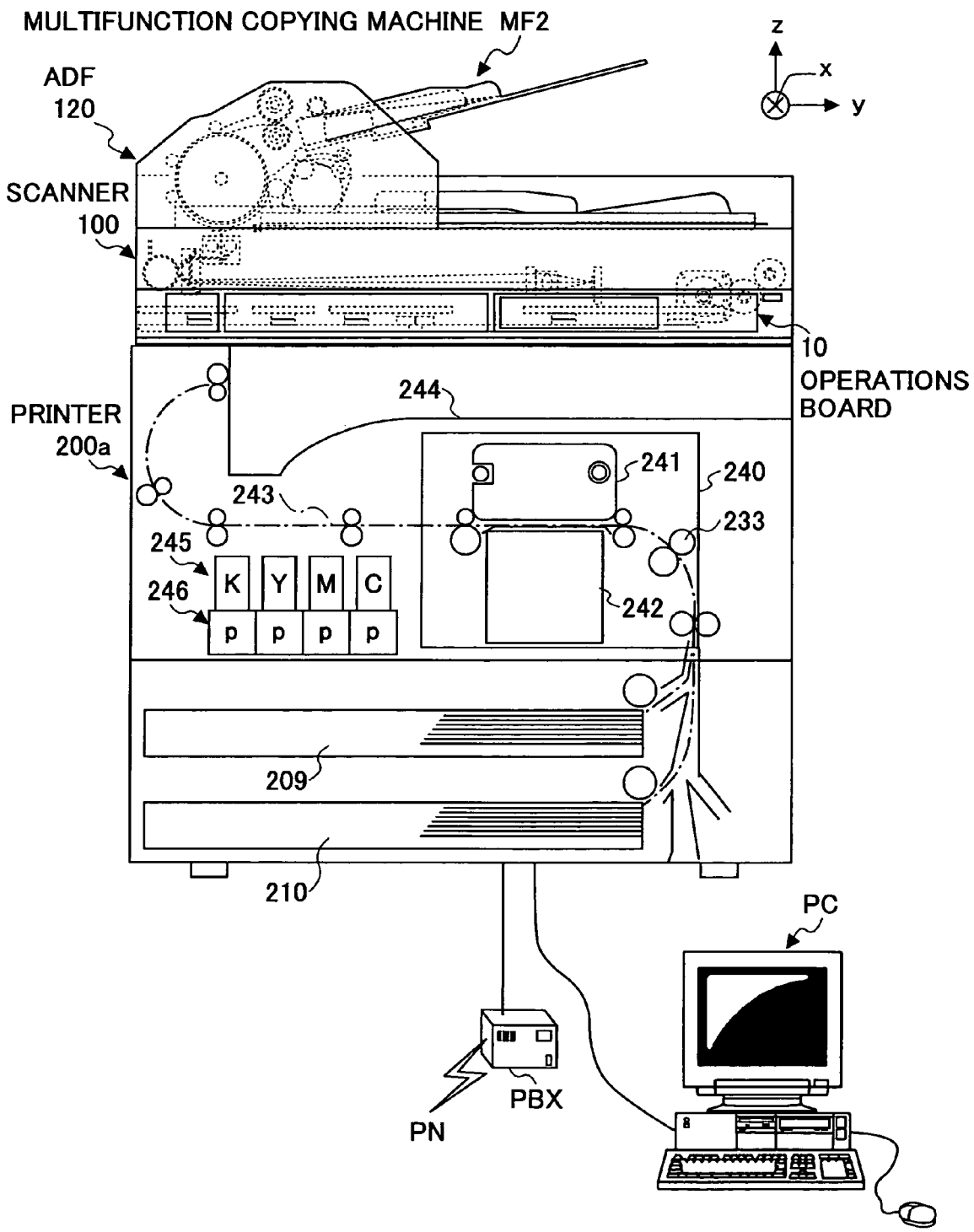
FIG. 18 is a cross-sectional diagram showing a configuration of a multifunction copying machine according to a second embodiment of the present invention.

FIG. 18 is a diagram showing a configuration of a full color multifunction copying machine MF2 according to a second embodiment of the present invention. The full color multifunction copying machine MF2 of the present embodiment includes an ADF 120, an operations board 10, and a color scanner 100 that are substantially identical to the ADF 120, the operations board 10, and the color scanner 100 of the full color multifunction copying machine MF1 according to the first embodiment. However, a printer 200a of the full color multifunction copying machine MF2 differs from the printer 200 of the full color multifunction copying machine MF1 in that it corresponds to a full color inkjet printer.

The inkjet printer 200a of the multifunction copying machine MF2 includes a print unit 240 having color ink jet heads arranged at a carriage 241 that is configured to move back and forth in a main scanning direction x. The inkjet heads include C, M, Y, and K ink recording heads arranged in the main scanning direction x, each of which ink recording heads includes plural ink spraying nozzles aligned in a sub scanning direction y. According to the present embodiment, by moving the carriage 241 in the main scanning direction x across one scan line, a color image may be formed on a paper region with a predetermined width in the sub scanning direction y through the spraying of the color inks of the color recording heads. Then, the paper may be moved in the sub scanning direction y by the predetermined width to realize image formation of a next scan line in the main scanning direction. By repeating the above process, a color image may be recorded on paper sent out from a paper cassette 209 or 210 to be fed to resist rollers 233 and conveyed along a traveling line 243. It is noted that paper on which image recording has been completed is delivered to a paper delivery tray 244. Also, ink cartridges 245 accommodating the C, M, Y, and K color inks, and corresponding pumps 246 for pumping ink from the ink cartridges 245 and supplying the ink to the color recording heads are arranged within the printer 200a.

It is noted that in the present embodiment, the carriage 241 (recording heads) may be driven to the position of a collection tank 242 so that test ink spraying may be performed right after power is turned on. Also, the test ink spraying may be performed before the output correction control step 25 of FIG. 13, for example. In this way, clogging of the ink spraying nozzles may be prevented and the ink spraying nozzles may be cleaned.

Figure 19:
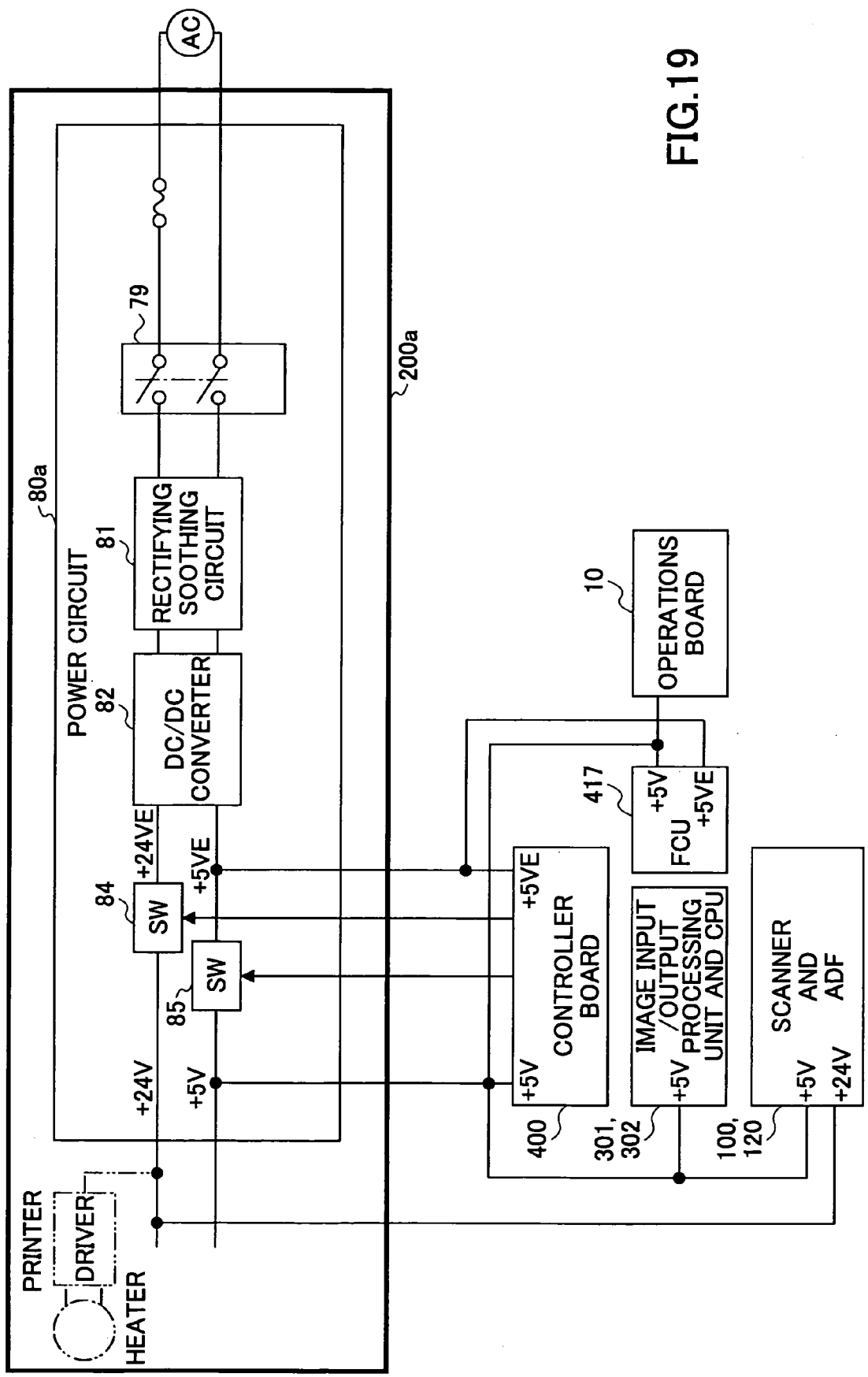
FIG. 19 is a block diagram showing a configuration of a power circuit of the multifunction copying machine according to the second embodiment.

FIG. 19 is a circuit diagram illustrating a configuration of a power circuit 80a of the multifunction copying machine MF2 of the second embodiment. It is noted that that the printer 200a of the copying machine MF2 does not include a fixer that requires high power. Instead, a heater and/or a fan that does not require high power may be arranged in the printer 200a in order to speed up the drying of ink sprayed on recording paper, for example. Thus, the power circuit 80a of the second embodiment does not include the AC circuit 86 that uses a 100 V alternating current power and the switch 83 that are included in the power circuit 80 of the first embodiment. Accordingly, a standby mode for the multifunction copying machine MF2 of the second embodiment corresponds to the low-power mode for the multifunction copying machine MF1 of the first embodiment. In a case where an air conditioning device such as a heater, a cooler, or a fan for drying ink or controlling internal machine temperature is arranged in the printer 200a of the second embodiment, the air conditioning device may be driven by the +24 V output, for example. It is noted that other hardware configurations of the power circuit 80a of the second embodiment may be identical to that of the power circuit 80 of the first embodiment.

As is described above, the power saving mode for the power circuit 80a of the second embodiment differs from that of the first embodiment. Accordingly, control processes for controlling the switching of modes (i.e., standby mode/sleep mode) executed by the controller board 400 (CPU 402), the operations board 100 (CPU 1), the CPU 301 of the engine 300, the read unit 101 (CPU thereof), and the AFE 111 (CPU 42) according to the second embodiment differs from the first embodiment.

Specifically, in the second embodiment, a standby mode setting step corresponding to steps 2 and 6 of FIGS. 11 and 12 involves switching on the switches 84 and 85 (i.e., operation of the switch 83 is omitted). Also, it is noted that the second embodiment does not have a low-power mode; that is, the low-power mode of the first embodiment in which the switches 84 and 85 are switched on corresponds to the standby mode of the second embodiment. Therefore, the control processes according to the second embodiment does not include the low-power mode setting step 16 of FIG. 12, and a sleep mode setting process corresponding to steps 10-12 of FIG. 11 is performed in place of such a low-power setting step.

Figure 20:
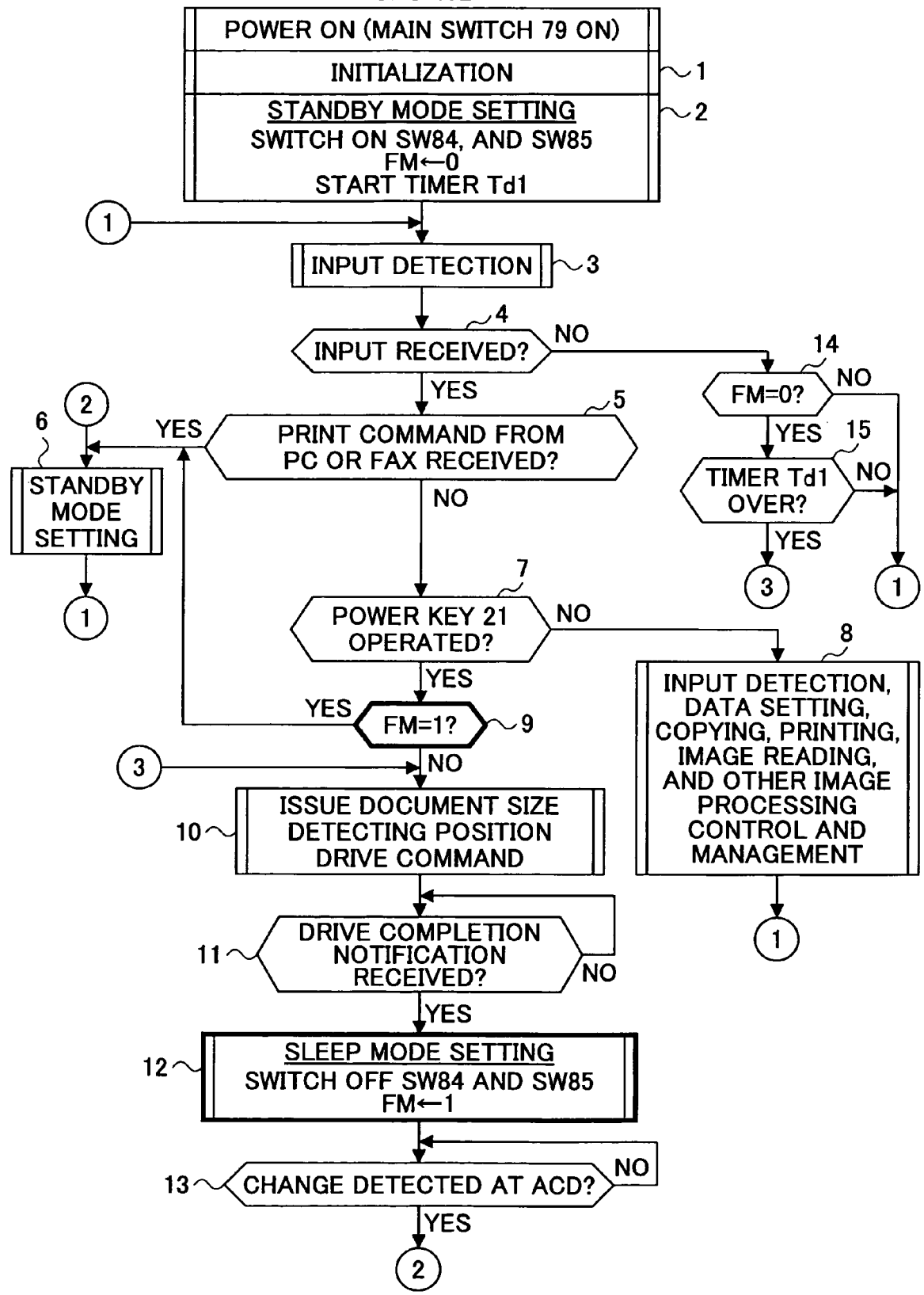
FIG. 20 is a flowchart illustrating a control process flow centered on power saving control that is executed by a CPU of a controller board of the multifunction copying machine of FIG. 18.

FIG. 20 is a flowchart illustrating a switching control process for switching between standby mode and sleep mode executed by the controller board 400 (CPU 402) according to the second embodiment. It is noted that process steps of the present control process that are identical to those shown in FIGS. 11 and 12 are assigned the same reference numerals. Also, it is noted that document detection, homing, and image output correction control (updating) executed by the CPU 301 of the engine 300, the read unit 110 (CPU thereof), and the AFE 111 (CPU 42) according to the second embodiment may be identical to the corresponding steps of the first embodiment as is illustrated in FIGS. 13 and 14.

Although the present invention is shown and described with respect to certain preferred embodiments, it is obvious that equivalents and modifications will occur to others skilled in the art upon reading and understanding the specification.

The present invention includes all such equivalents and modifications, and is limited only by the scope of the claims.

The present application is based on and claims the benefit of the earlier filing date of Japanese Patent Application No. 2005-052888 filed on Feb. 28, 2005, the entire contents of which are hereby incorporated by reference.

What is claimed is:

1. An image reading apparatus comprising:
    an image sensor configured to convert image light of a document into an image signal;
    an optical unit configured to project the image light of the document on the image sensor;
    a drive unit configured to drive the optical unit in a sub scanning direction;
    a document size detecting unit configured to detect a size of the document using the image signal;
    an image signal processing unit configured to digitally convert the image signal of the image sensor into image data;
    a power circuit configured to output an operating voltage in standby mode and stop the outputting of the operating voltage in sleep mode; and
    a power saving control unit configured to move the optical unit to a document size detecting position, different from a home position and a reference white plate reading position, by operating the drive unit before switching the power circuit from the standby mode to the sleep mode,
    wherein, after the power circuit is switched from the sleep mode to the standby mode by the power saving control unit, the document size detecting unit detects the size of the document.

2. The image reading apparatus as claimed in claim 1, further comprising:
    a translucent plate configured to support the document;
    a holding member configured to hold down the document placed on the translucent plate; and
    a downward movement detecting unit configured to detect a downward movement of the holding member moving towards the document placed on the translucent plate;
    wherein the document size detecting unit is configured to detect the size of the document when the downward movement of the holding member is detected.

3. The image reading apparatus as claimed in claim 2, further comprising:
    an upward movement detecting unit configured to detect an upward movement of the holding member moving away from the document placed on the translucent plate;
    wherein the power saving control unit is configured to switch the power circuit to the standby mode when the upward movement of the holding member is detected.

4. The image reading apparatus as claimed in claim 1, further comprising:
    a reference point sensor arranged at a predetermined position with respect to the sub scanning direction and configured to detect the optical unit;
    wherein the drive unit is configured to drive the optical unit towards a sub scanning drive start position after the document size detecting unit detects the size of the document, and initialize sub scanning position information of the optical unit to information representing the predetermined position of the reference point sensor with respect to the sub scanning direction when the reference point sensor detects that the optical unit has reached said predetermined position.

5. The image reading apparatus as claimed in claim 1, further comprising:
    a reference point sensor arranged at a predetermined position with respect to the sub scanning direction and configured to detect the optical unit;
    wherein when an external power source is connected to the power circuit, the power saving control unit is powered by the power circuit and sets the power circuit to the standby mode, and the drive unit drives the optical unit towards a sub scanning drive start position and initializes sub scanning position information of the optical unit to information representing the predetermined position of the reference point sensor with respect to the sub scanning direction when the reference point sensor detects that the optical unit has reached said predetermined position.

6. The image reading apparatus as claimed in claim 5, wherein
    after the sub scanning position information of the optical unit is initialized, the image signal processing unit drives the optical unit to the reference white plate reading position for reading a reference white plate, reads the reference white plate, and updates digital conversion parameters including an image signal amplification gain used for digitally converting the image signal of the image sensor into the image data.

7. The image reading apparatus as claimed in claim 1, further comprising:
    a translucent plate configured to support the document;
    a holding member configured to hold down the document placed on the translucent plate; and
    an open/closed state detecting unit configured to detect an open/closed state of the holding member with respect to the translucent plate;
    wherein the power saving control unit includes a detection circuit configured to detect a change in the open/closed state detection of the open/closed state detecting unit while the power circuit is in the sleep mode, and switch the power circuit to the standby mode upon detecting the change in the open/closed state detection.

8. The image reading apparatus as claimed in claim 1, further comprising:
    a sheet-through reading conveying unit configured to convey the document in a direction traversing a sheet-through reading range of the optical unit in the sub scanning direction which sheet-through reading range is realized when the optical unit is positioned at a sheet through reading position.

9. An image reading apparatus comprising:
    an image sensor configured to convert image light of a document into an image signal;
    an optical unit configured to project the image light of the document on the image sensor;
    a drive unit configured to drive the optical unit in a sub scanning direction;
    a document size detecting unit configured to detect a size of the document using the image signal;
    an image signal processing unit configured to digitally convert the image signal of the image sensor into image data;
    a power circuit configured to output an operating voltage in standby mode and stop the outputting of the operating voltage in sleep mode;
    a power saving control unit configured to position the optical unit to a document size detecting position before switching the power circuit from the standby mode to the sleep mode;

a translucent plate configured to support the document;

a holding member configured to hold down the document placed on the translucent plate;

an open/closed state detecting unit configured to detect an open/closed state of the holding member with respect to the translucent plate;

a reference point sensor arranged at a predetermined position with respect to the sub scanning direction and configured to detect the optical unit; and a document feeding unit including a document tray configured to accommodate the document, a sheet-through reading conveying unit configured to convey the document placed in the document tray in a direction traversing a sheet-through reading range of the optical unit in the sub scanning direction which sheet-through reading range is realized when the optical unit is positioned at a sheet-through reading position, and a document sensor configured to detect the document placed in the document tray;

wherein the power saving unit includes a signal generating unit configured to generate a signal indicating whether the outputting of the operating voltage by the power circuit is caused by an external power source being connected to the power circuit or a switching of the power circuit from the sleep mode to the standby mode; and in a case where the signal indicates that the outputting of the operating voltage by the power circuit is caused by the switching of the power circuit from the sleep mode to the standby mode, the drive unit drives the optical unit towards a sub scanning drive start position when the open/closed state detecting unit detects that the holding member is in a closed state and the document sensor detects that the document is placed in the document tray, and initializes sub scanning position information of the optical unit to information representing the predetermined position of the reference point sensor with respect to the sub scanning direction when the reference point sensor detects that the optical unit has reached said predetermined position.

10. The image reading apparatus as claimed in claim 9, wherein in a case where the signal indicates that the outputting of the operating voltage by the power circuit is caused by the external power source being connected to the power circuit, the drive unit drives the optical unit towards the sub scanning drive start position, and initializes the sub scanning position information of the optical unit to the information representing the predetermined position of the reference point sensor with respect to the sub scanning direction when the reference point sensor detects that the optical unit has reached said predetermined position.

11. The image reading apparatus as claimed in claim 10, wherein after the sub scanning position information is initialized, the image signal processing unit drives the optical unit to a reference white plate reading position for reading a reference white plate, reads the reference white plate, and updates digital conversion parameters including an image signal amplification gain used for digitally converting the image signal of the image sensor into the image data.

12. The image reading apparatus as claimed in claim 11, wherein the reference white plate is positioned between the sub scanning drive start position and the document size detecting position.

13. The image reading apparatus as claimed in claim 11, wherein the reference point sensor and the reference white plate are positioned between the sub scanning drive start position and the document size detecting position.

14. The image reading apparatus as claimed in claim 9, wherein the reference point sensor is positioned between the sub scanning drive start position and the document size detecting position.

15. The image reading apparatus as claimed in claim 9, wherein the sheet-through reading position corresponds to the sub scanning drive start position.

16. An imaging apparatus, comprising:

an image reading apparatus configured to generate read image data;

an image data processing unit configured to convert the read image data generated by the image reading apparatus into printer image data;

a printer configured to print an image represented by the printer image on a recording medium;

an input unit configured to input a document reading command for the image reading apparatus and a printing command for the printer; and a control unit configured to control document reading executed by the image reading apparatus and printing executed by the printer in response to the document reading command and the printing command;

wherein the image reading apparatus includes an image sensor configured to convert image light of a document into an image signal;

an optical unit configured to project the image light of the document on the image sensor;

a drive unit configured to drive the optical unit in a sub scanning direction;

a document size detecting unit configured to detect a size of the document using the image signal;

an image signal processing unit configured to digitally convert the image signal of the image sensor into the read image data;

a power circuit configured to output an operating voltage in standby mode and stop the outputting of the operating voltage in sleep mode; and a power saving control unit configured to move the optical unit to a document size detecting position, different from a home position and a reference white plate reading position, by operating the drive unit before switching the power circuit from the standby mode to the sleep mode, wherein, after the power circuit is switched from the sleep mode to the standby mode by the power saving control unit, the document size detecting unit detects the size of the document.

17. The imaging apparatus as claimed in claim 16, wherein the printer corresponds to an electrophotographic printer that is configured to form a toner image on a photoconductor, transfer the toner image onto the recording medium, and fix the toner image transferred onto the recording medium using a fixer; and the power circuit is associated with a plurality of loads including the fixer and is configured to be switched between the standby mode in which power is supplied to all of the loads, a low-power mode in which power is supplied to the loads other than the fixer, and the sleep mode in which power is only supplied to an input operation detecting unit configured to detect an input operation and set the power circuit to the standby mode in response to the input operation.

18. The imaging apparatus as claimed in claim 17, further comprising:
a storing unit configured to store a first switching waiting time Td1 for switching from the standby mode to the low-power mode, and a second switching waiting time Td2 for switching from the low-power mode to the sleep mode;
wherein the power saving control unit is configured to switch the power circuit from the standby mode to the low-power mode when the power circuit is set to the standby mode for a time period corresponding to the first switching waiting time Td1 without detecting any input operation, and switch the power circuit from the low-power mode to the sleep mode when the power circuit is set to the low-power mode for a time period corresponding to the second switching waiting time Td2 without detecting any input operation.

19. The imaging apparatus as claimed in claim 16, wherein the printer corresponds to an inkjet printer configured to spray ink on the recording medium;
the power circuit is associated with a plurality of loads and is configured to be switched between the standby mode in which power is supplied to all of the loads, and sleep mode in which power is only supplied to an input operation detecting unit configured to detect an input operation and set the power circuit to the standby mode in response to the input operation.

20. The imaging apparatus as claimed in claim 19, further comprising:
a storing unit configured to store a switching waiting time for switching from the standby mode to the sleep mode;
wherein the power saving control unit is configured to switch the power circuit from the standby mode to the sleep mode when the power circuit is set to the standby mode for a time period corresponding to the switching waiting time without detecting any input operation.

* * * * *